(12) United States Patent
Hofmann et al.

(10) Patent No.: US 9,015,348 B2
(45) Date of Patent: Apr. 21, 2015

(54) DYNAMICALLY SELECTING BETWEEN ACCELERATION TECHNIQUES BASED ON CONTENT REQUEST ATTRIBUTES

(71) Applicant: Limelight Networks, Inc., Tempe, AZ (US)

(72) Inventors: Jason Hofmann, New York, NY (US); Hemdat Cohen-Shraga, Elkana (IL); Erez Yaffe, Tel Aviv (IL)

(73) Assignee: Limelight Networks, Inc., Tempe, AZ (US)

( * ) Notice: Subject to any disclaimer, the term of this patent is extended or adjusted under 35 U.S.C. 154(b) by 42 days.

(21) Appl. No.: 13/946,777

(22) Filed: Jul. 19, 2013

(65) Prior Publication Data
US 2015/0026239 A1    Jan. 22, 2015

(51) Int. Cl.
G06F 15/173    (2006.01)
H04L 29/06    (2006.01)

(52) U.S. Cl.
CPC ................................ *H04L 29/06047* (2013.01)

(58) Field of Classification Search
None
See application file for complete search history.

(56) References Cited

U.S. PATENT DOCUMENTS

| | | | |
|---|---|---|---|
| 5,802,292 A | 9/1998 | Mogul | |
| 5,826,031 A | 10/1998 | Nielsen | |
| 5,884,098 A | 3/1999 | Mason, Jr. | |
| 5,894,554 A | 4/1999 | Lowery et al. | |
| 6,023,726 A | 2/2000 | Saksena | |
| 6,055,572 A | 4/2000 | Saksena | |
| 6,067,565 A | 5/2000 | Horvitz | |
| 6,085,226 A | 7/2000 | Horvitz | |
| 6,098,064 A | 8/2000 | Pirolli et al. | |
| 6,272,534 B1 | 8/2001 | Guha | |
| 6,338,096 B1 | 1/2002 | Ukelson | |
| 6,385,641 B1 | 5/2002 | Jiang et al. | |
| 6,553,393 B1 | 4/2003 | Eilbott et al. | |
| 6,578,073 B1 | 6/2003 | Starnes et al. | |
| 6,654,807 B2 | 11/2003 | Farber et al. | |

(Continued)

FOREIGN PATENT DOCUMENTS

KR    20030029244 A    4/2003

OTHER PUBLICATIONS

Bartolini, "A Walk through Content Delivery Networks", Retrieved on Jul. 4, 2012 from http://wwwusers.di.uniroma1.it/~novella/articoli/CDN_tutorial.pdf, 2012, p. 1-25.

(Continued)

*Primary Examiner* — Scott B Christensen
(74) *Attorney, Agent, or Firm* — Kilpatrick Townsend & Stockton, LLP

(57) ABSTRACT

A system for dynamically selecting from among a plurality of acceleration techniques implemented in a Content Delivery Network (CDN) using attributes associated with content requests may include a network interface that receives a content request from a client system for content, where the request is associated with one or more attributes. The system may also include an intermediate server that accelerates access to the content stored in the CDN edge servers. The intermediate server may include a processor configured to access the one or more attributes associated with the content request, select one or more acceleration techniques from the plurality of acceleration techniques where the one or more acceleration techniques are selected based on the one or more attributes, and use the one or more acceleration techniques to provide the content to the client system.

19 Claims, 13 Drawing Sheets

(56) References Cited

U.S. PATENT DOCUMENTS

| | | |
|---|---|---|
| 6,665,658 B1 | 12/2003 | DaCosta et al. |
| 6,799,214 B1 | 9/2004 | Li |
| 6,834,297 B1 | 12/2004 | Peiffer et al. |
| 6,976,090 B2 | 12/2005 | Ben-Shaul et al. |
| 6,993,591 B1 | 1/2006 | Klemm |
| 7,007,237 B1 | 2/2006 | Sharpe |
| 7,012,612 B1 | 3/2006 | O'Neill et al. |
| 7,084,877 B1 | 8/2006 | Panusopone et al. |
| 7,100,111 B2 | 8/2006 | McElfresh et al. |
| 7,107,338 B1 | 9/2006 | Nareddy et al. |
| 7,113,935 B2 | 9/2006 | Saxena |
| 7,240,100 B1 | 7/2007 | Wein et al. |
| 7,243,309 B2 | 7/2007 | Koay et al. |
| 7,249,196 B1 | 7/2007 | Peiffer et al. |
| 7,308,490 B2 | 12/2007 | Peiffer et al. |
| 7,337,248 B1 | 2/2008 | Rao et al. |
| 7,373,599 B2 | 5/2008 | McElfresh et al. |
| 7,483,941 B2 | 1/2009 | Carlson et al. |
| 7,594,003 B2 | 9/2009 | Davidson et al. |
| 7,594,013 B2 | 9/2009 | Wang et al. |
| 7,636,770 B2 | 12/2009 | Bennett et al. |
| 7,689,663 B2 | 3/2010 | Kinnan et al. |
| 7,814,172 B2 | 10/2010 | Martin et al. |
| 7,818,686 B2 | 10/2010 | Cooke |
| 7,860,881 B2 | 12/2010 | Haselden et al. |
| 7,886,218 B2 | 2/2011 | Watson |
| 7,941,483 B2 | 5/2011 | Narayanan et al. |
| 7,958,232 B1 | 6/2011 | Colton et al. |
| 8,028,090 B2 | 9/2011 | Richardson et al. |
| 8,060,518 B2 | 11/2011 | Timmons |
| 8,112,703 B2 | 2/2012 | Kumar et al. |
| 8,122,102 B2 | 2/2012 | Wein et al. |
| 8,166,079 B2 | 4/2012 | Lewin et al. |
| 8,219,633 B2 | 7/2012 | Fainberg et al. |
| 8,219,647 B2 | 7/2012 | Harvell et al. |
| 8,250,457 B2 | 8/2012 | Fainberg et al. |
| 8,346,784 B1 | 1/2013 | Potekhin et al. |
| 8,495,171 B1 | 7/2013 | Potekhin et al. |
| 2002/0063714 A1 | 5/2002 | Haas et al. |
| 2002/0078087 A1 | 6/2002 | Stone |
| 2002/0078165 A1 | 6/2002 | Genty et al. |
| 2003/0101412 A1 | 5/2003 | Eid |
| 2004/0030717 A1 | 2/2004 | Caplin |
| 2004/0088375 A1 | 5/2004 | Sethi et al. |
| 2004/0215665 A1 | 10/2004 | Edgar et al. |
| 2004/0225562 A1 | 11/2004 | Turner |
| 2005/0044491 A1 | 2/2005 | Peterson |
| 2005/0138143 A1 | 6/2005 | Thompson |
| 2005/0154781 A1 | 7/2005 | Carlson et al. |
| 2005/0198191 A1 | 9/2005 | Carlson |
| 2006/0093030 A1 | 5/2006 | Francois et al. |
| 2006/0218305 A1 | 9/2006 | Kinnan et al. |
| 2007/0022102 A1 | 1/2007 | Saxena |
| 2007/0156845 A1 | 7/2007 | Devanneaux et al. |
| 2007/0162434 A1 | 7/2007 | Alessi et al. |
| 2007/0208610 A1 | 9/2007 | Pisaris-Henderson et al. |
| 2007/0256003 A1 | 11/2007 | Wagoner et al. |
| 2007/0260748 A1 | 11/2007 | Talkington |
| 2008/0005672 A1 | 1/2008 | Mestres et al. |
| 2008/0071859 A1 | 3/2008 | Seed et al. |
| 2008/0139191 A1 | 6/2008 | Melnyk et al. |
| 2008/0155425 A1 | 6/2008 | Murthy et al. |
| 2008/0195712 A1 | 8/2008 | Lin et al. |
| 2008/0228772 A1 | 9/2008 | Plamondon |
| 2008/0228911 A1 | 9/2008 | Mackey |
| 2009/0037454 A1 | 2/2009 | Sampson et al. |
| 2009/0125481 A1 | 5/2009 | Mendes da Costa et al. |
| 2009/0240698 A1 | 9/2009 | Shukla et al. |
| 2009/0300111 A1 | 12/2009 | Rana |
| 2010/0017696 A1 | 1/2010 | Choudhary et al. |
| 2010/0149091 A1 | 6/2010 | Kota et al. |
| 2010/0169455 A1 | 7/2010 | Gorham |
| 2010/0269050 A1 | 10/2010 | Kirkby et al. |
| 2010/0281357 A1 | 11/2010 | Fu et al. |
| 2010/0299589 A1 | 11/2010 | Yamada |
| 2010/0306643 A1 | 12/2010 | Chabot et al. |
| 2011/0016180 A1 | 1/2011 | Bharadhwaj et al. |
| 2011/0029899 A1 | 2/2011 | Fainberg et al. |
| 2011/0066676 A1 | 3/2011 | Kleyzit et al. |
| 2011/0087966 A1 | 4/2011 | Leviathan et al. |
| 2011/0113000 A1 | 5/2011 | Marlow |
| 2011/0276446 A1 | 11/2011 | Gupta et al. |
| 2011/0289486 A1 | 11/2011 | Revinskaya et al. |
| 2011/0302321 A1 | 12/2011 | Vange et al. |
| 2012/0030224 A1 | 2/2012 | Cohen et al. |
| 2012/0054595 A1 | 3/2012 | Mylroie et al. |
| 2012/0079057 A1 | 3/2012 | Fainberg et al. |
| 2012/0185370 A1 | 7/2012 | Davie et al. |
| 2012/0198022 A1 | 8/2012 | Black et al. |
| 2013/0227078 A1* | 8/2013 | Wei et al. ..................... 709/219 |
| 2013/0326022 A1 | 12/2013 | Ehrlich et al. |

OTHER PUBLICATIONS

Bogdanov et al., "A prototype of online privacy-preserving questionnaire system," 2010, 6 pages.

Chen, G., et al., "Building a Scalable Web Server with Global Object Space Support on Heterogeneous Clusters," Third IEEE International Conference on Cluster Computing (CLUSTER'01), 2001, 8 pages.

Gardner et al., "DOM: Towards a Formal Specification," Plan-X ' 08, Jan. 9, 2008, San Francisco, 2008, 10 pages.

Jansen, "Guidelines on Active Content and Mobile Code", Retrieved on Jul. 4, 2012 from http://csrc.nist.gov/publications/nistpubs/800-28-ver2/SP800-28v2.pdf, NIST Special Publication 800-28 Version 2, Mar. 2008, p. 1-62.

Jing, J., et al., "Client Server Computing in Mobile Environments," ACM Computing Surveys, Jun. 1999, pp. 117-157, vol. 31, No. 2.

Mor, "Evaluation of Delivery Techniques for Dynamic Web Content", Retrieved on Jul. 2, 2012, http://infolab.stanford.edu/~mor/research/eodposter.pdf, pp. 1-2.

Pallis et al., "Insight and Perspectives for Content Delivery Network", Retrieved on Sep. 5, 2012 from http://gridsec.usc.edu/files/EE657/P2P-CDNetworks-Survey-2006.pdf, Jan. 2006, vol. 49, p. 1-6.

Rayburn, "How Dynamic Site Acceleration Works, What Akamai and Cotendo Offer", Retrieved on Jul. 4, 2012 from http://blog.streamingmedia.com/the_business_of_online_vi/2010/10/how-dynamic-site-acceleration-works-what-akamai-and-cotendo-offer.html, Oct. 18, 2010, p. 1-4.

Seifert et al., "Identification of Malicious Web Pages with Static Heuristics," IEEE, 2008, pp. 91-96.

U.S. Appl. No. 13/245,841, Office Action mailed Mar. 5, 2012, 17 pages.

U.S. Appl. No. 13/245,841, Notice of Allowance mailed Jul. 2, 2012, 4 pages.

U.S. Appl. No. 13/245,711, Notice of Allowance mailed Apr. 24, 2012, 10 pages.

U.S. Appl. No. 12/848,559, Office Action mailed Aug. 3, 2012, 26 pages.

U.S. Appl. No. 13/471,211, Office Action mailed Aug. 8, 2012, 14 pages.

Wikipedia, "Web accelerator", Retrieved on Mar. 14, 2012, from http://en.wikipedia.org/wiki/Web_accelerator, Jan. 11, 2012, p. 1-3.

* cited by examiner

DYNAMICALLY SELECTING BETWEEN ACCELERATION TECHNIQUES BASED ON CONTENT REQUEST ATTRIBUTES

FIELD OF THE INVENTION

This disclosure relates in general to a content delivery network (CDN) and, but not by way of limitation, more specifically to the acceleration of access to content provided by the CDN.

BACKGROUND OF THE INVENTION

A content delivery network (CDN) is a large distributed system of servers deployed in multiple data centers thoughout the Internet. The goal of a CDN is to serve content to end-users with high availability and high performance. Besides better performance and availability, CDNs also offload the traffic served directly from the content provider's origin infrastructure. CDNs can include geographically distributed points of presence (POPs) to locate edge servers close to end users. CDNs are capable of delivering content in high demand with higher quality of service (QoS). Content can be requested from a CDN using a universal resource locator (URL). Various techniques are used to route a URL request to a nearby POP, for example, in order to efficiently retrieve content.

The traffic over the Internet is growing rapidly as is the complexity and size of the information moved from sources of information to users of such information. Bottlenecks in the movement of data between CDN servers and client systems decrease the quality of the user experience. Traffic is expected to increase faster than the ability to resolve data transfers over the Internet. Therefore, improvements in the art are needed.

BRIEF SUMMARY OF THE INVENTION

In one embodiment, a system for dynamically selecting from among a plurality of acceleration techniques implemented in a Content Delivery Network (CDN) using attributes associated with content requests may be presented. The system may include a network interface that receives the content requests from a plurality of client systems for content stored in a plurality of edge servers distributed geographically throughout the CDN. In some embodiments, the content requests may include a first content request for first content, the first content request may originate from a first client system in the plurality of client systems, and/or the first content request may be associated with one or more attributes. The system may further include an intermediate server that accelerates access to the content stored in the plurality of edge servers. The intermediate server may include a first interface coupled to the network interface, a second interface configured to communicate with at least one of the plurality of edge servers of the CDN, and a memory device having stored thereon instructions for executing each of the plurality of acceleration techniques. The intermediate server may also include a processor configured to access the one or more attributes associated with the first content request, select one or more acceleration techniques from the plurality of acceleration techniques. The one or more acceleration techniques may be selected based on the one or more attributes. The processor may be further configured to use the one or more acceleration techniques to provide the content to the first client system.

In some embodiments, the one or more attributes may affect a performance of the one or more acceleration techniques in providing the first content to a user of the first client system. The one or more attributes may also be descriptive of the first client system or a network through which the first content request is received. The one or more attributes may include a geographic location of the first client system. The one or more attributes may include a measurement of latency associated with transmitting content from the CDN to the first client system. The one or more attributes may include a device type of the first client system. The one or more attributes may include a screen size of the first client system. The intermediate server may be physically combined with one of the plurality of edge servers of the CDN.

In some embodiments, the memory device may also store a plurality of acceleration profiles. Each of the plurality of acceleration profiles may include at least one of the plurality of acceleration techniques. The one or more acceleration techniques selected by the intermediate server may be selected as one of the plurality of acceleration profiles. The processor may be further configured to receive metrics from the first client system, where the metrics are associated with a performance in providing the first content to a user of the first client system. The processor may be further configured to dynamically update a process by which the one or more acceleration techniques are selected based on the metrics, and use the updated process to select acceleration techniques for subsequent requests associated with similar attributes. The first client system may include a testbed simulator that is configured to simulate a plurality of client system configurations and network connections.

In another embodiment, a method of dynamically selecting from among a plurality of acceleration techniques implemented in a CDN using attributes associated with content requests may be presented. The method may include receiving a first content request for first content through a network interface. In some embodiments, the network interface may be configured to receive the content requests from a plurality of client systems for content stored in a plurality of edge servers distributed geographically throughout the CDN. The first content request may originate from a first client system in the plurality of client systems, and the first content request may be associated with one or more attributes. The method may also include accessing, by an intermediate server, the one or more attributes associated with the first content request. In some embodiments, the intermediate server may be configured to accelerate access to the content stored in the plurality of edge servers. The method may additionally include selecting, by the intermediate server, one or more acceleration techniques from the plurality of acceleration techniques, where the one or more acceleration techniques are selected based on the one or more attributes. The method may further include using, by the intermediate server, the one or more acceleration techniques to provide the content to the first client system.

BRIEF DESCRIPTION OF THE DRAWINGS

The subject matter that is regarded as the invention is particularly pointed out and distinctly claimed in the claims at the conclusion of the specification. The foregoing and other objects, features, and advantages will be apparent from the following detailed description taken in conjunction with the accompanying drawings.

DETAILED DESCRIPTION OF THE INVENTION

The ensuing description provides descriptions of exemplary embodiments only, and is not intended to limit the scope, applicability, or configuration of the disclosure. Rather, the ensuing description of the exemplary embodiments will provide those skilled in the art with an enabling description for implementing the embodiments of the claims. It will be understood that various changes may be made in the function and arrangement of elements without departing from the spirit and scope as set forth in the appended claims.

Figure 1:
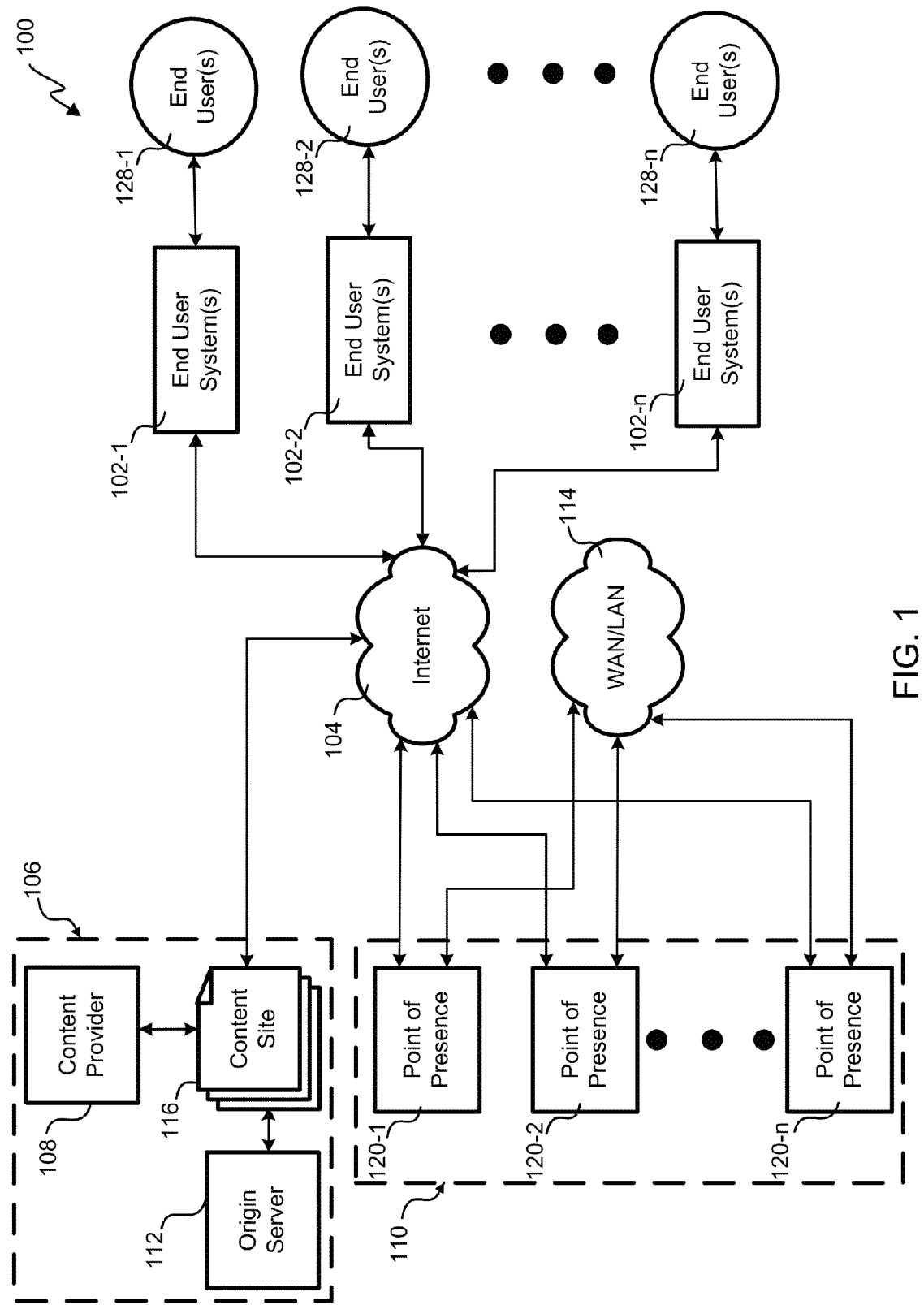
FIG. 1 illustrates a block diagram of an embodiment of a content distribution system.

Referring first to FIG. 1, a block diagram of an embodiment of a content distribution system 100 is shown. The content originator 106 offloads delivery of the content objects to a content delivery network (CDN) 110 in this embodiment. The content originator 106 produces and/or distributes content objects and may include a content provider 108, a content site 116, and/or an origin server 112. The CDN 110 can both cache and/or host content in various embodiments for third parties, such as the content originator 106, to offload delivery and typically provide better quality of service (QoS) to a broad spectrum of end-user systems 102 distributed worldwide.

In this embodiment, the content distribution system 100 locates the content objects (or portions thereof) and distributes the content objects to one or more end-user systems 102. The content objects can be dynamically cached and/or hosted within the CDN 110. A content object may include any content file or content stream and could include, for example, video, pictures, data, audio, software, analytics, and/or text. The content object could be live, delayed, or stored. Throughout the specification, references may be made to a content object, content, content stream and/or content file, but it is to be understood that those terms could be used interchangeably wherever they may appear.

Many content providers 108 may use a CDN 110 or even multiple CDNs 110 to deliver the content objects over the Internet 104 to end users 128. The CDN 110 may include a number of points of presence (POPs) 120, which are geographically distributed through the content distribution system 100 to deliver content. Various embodiments may have any number of POPs 120 within the CDN 110 that are generally distributed in various locations around the Internet 104 so as to be proximate to end-user systems 102 in a network sense. Routing requests between the multiple POPs can be done during the DNS resolution and refined by assignment of an edge server. Other embodiments use routing, redirection, Anycast, DNS assignment and/or other techniques to locate the particular edge server that are able to provide content to the end users 128. In addition to the Internet 104, a wide area network (WAN), and/or a local area network (LAN) 114 or other backbone may couple the POPs 120 with each other and with other parts of the CDN 110.

When an end user 128 requests content, such as a web page, through its respective end-user system 102 while browsing, the request for the web page can be passed either directly or indirectly via the Internet 104 to the content originator 106. The content originator 106 may be defined as the source or re-distributor of content objects. The content site 116 may include an Internet web site accessible by the end-user system 102. For example, the content site 116 could be a web site where the content is viewable using a web browser. In other embodiments, the content site 116 could be accessible with application software or customized hardware other than a web browser, for example, a set top box, a content player, video streaming appliance, a podcast player, an app running on a smart phone, etc. The content provider 108 can redirect such content requests to the CDN 110 after they are made, or alternatively can formulate the delivery path by embedding the delivery path into the universal resource indicators (URIs) for a web page. In either case, the request for content can be handed over to the CDN 110 in this embodiment by having the end-user system 102 perform a DNS look-up so as to choose which of the multiple POPs 120 should provide the requested content.

A particular edge server may retrieve the portion of the content object from the content provider 108. Alternatively, the content provider 108 may directly provide the content object to the CDN 110 and its associated POPs 120 through prepopulation, i.e., in advance of the first request. The servers of the CDN 110 may include edge servers in each POP 120 that are configured to serve end user requests and/or store the actual content. The origin server 112 may continue to store a copy of each content object for the content originator 106. Periodically, the content of the origin server 112 may be reconciled with the CDN 110 through a cache, hosting, and/or pre-population algorithms. Some content providers could use an origin server within the CDN 110 to host the content and thus avoid the need to maintain a separate copy.

Once the content object is retrieved from the origin server 112, the content object may be stored within the particular POP 120 and may be served from that POP 120 to the end-user system 102. The end-user system 102 may receive the content object and processes it for use by the end user 128. The end-user system 102 could be a personal computer, media player, tablet computer, handheld computer, Internet appliance, phone, IPTV set top, video stream player, streaming radio, PDA, smart phone, digital music player, or any other device that can be configured to receive and process content objects. In some embodiments, a number of the end-user systems 102 could be networked together. Although this embodiment only shows a single content originator 106 and a single CDN 110, it will be understood that there could be many of each in various embodiments. Additionally, in some embodiments a content originator 106 could have a "captive" CDN 110 that is optionally used for its content when a third-party CDN is used to shed requests.

Figure 2:
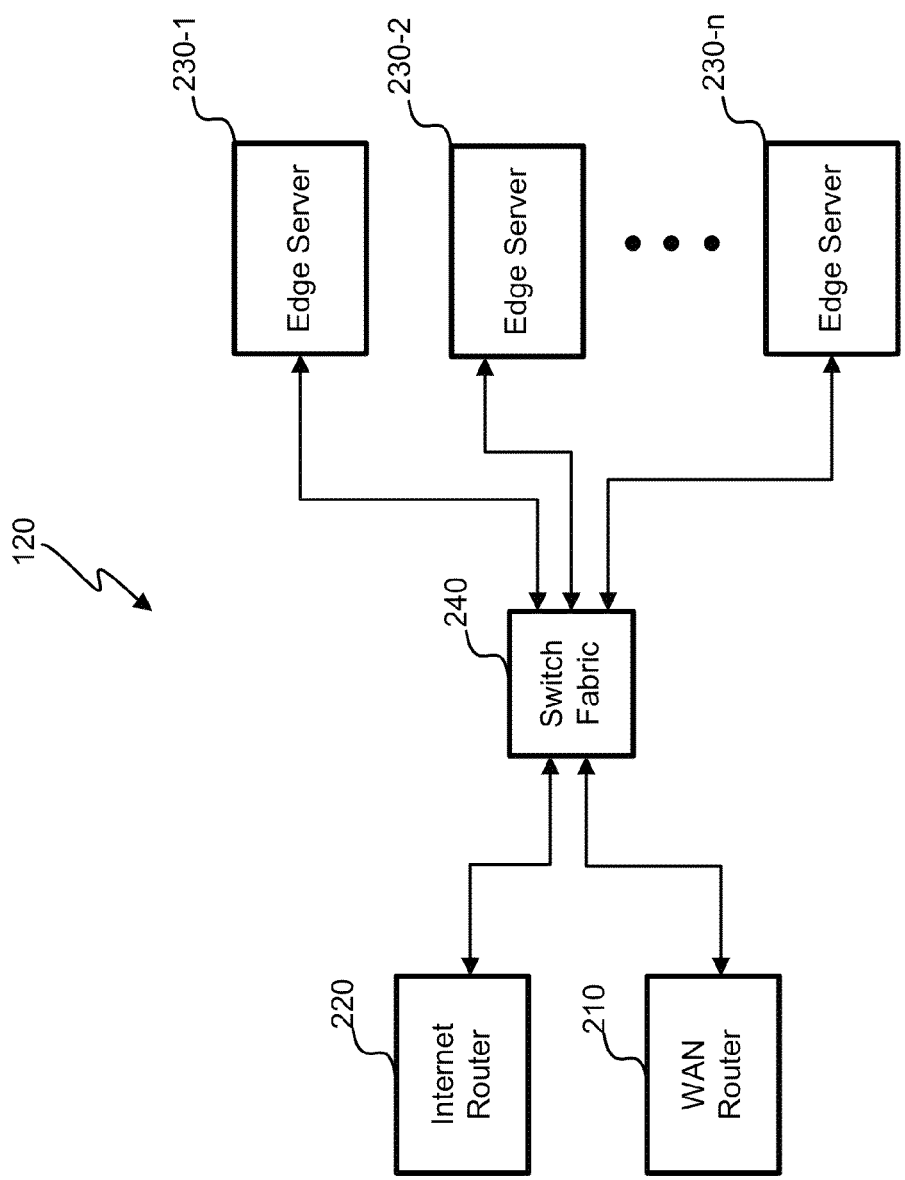
FIG. 2 illustrates a block diagram of an embodiment of a point of presence (POP) that is part of a content delivery network (CDN).

With reference to FIG. 2, a block diagram of an embodiment of a POP 120 is shown that is part of the CDN 110. Although only one POP 120 is depicted, there may be a number of POPs 120 similarly configured and geographically distributed throughout the CDN 110. The POPs 120 can communicate through a WAN router 210 and/or an Internet router 220 for locating content objects. An interface to the Internet 104 from the POP 120 accepts requests for content objects from end-user systems 102. The request comes from an Internet protocol (IP) address in the form of a URI.

Edge servers 230 may be implemented using general purpose computers loaded with software to perform various functions for the CDN 110. The edge servers 230 could be rack mounted or arranged in clusters. Multiple hardware processors and storage media could be used to implement each edge server 230. Each edge server 230 can load multiple instances of the same software and/or a variety of software to implement various functionalities. For example, software may be used on edge servers to implement switching fabric, routing, caching, hosting, DNS lookup, analytics, business rules, delivery assignment, and/or the like. The software instances can scale with the size of each POP 120. Different edge servers 230 may have a different set of functionality as defined by the software instances that are programmed to run on each edge server 230.

Switch fabric 240 assigns the request to one of the edge servers 230 according to a routing scheme such as round robin, load balancing, Cache Array Routing Protocol (CARP), random, and/or the like. In this embodiment, the switch fabric may be aware of which edge servers 230 have particular capabilities and may assign requests within the group having the particular capability to store and serve the particular content object referenced in a requested URI. A protocol such as CARP may be used in this embodiment to dispense the URIs between the edge servers 230. Every time that a particular URI is requested from the group, it may be assigned to the same edge server 230. For purposes of assigning a request, edge servers may be grouped together based on their ability to provide a requested content object, service a particular type of request, and/or the like.

In another embodiment, the switch fabric 240 assigns the request to one of the edge servers 230, which can either service the request or reassign it to a neighboring edge server 230 with software to perform an assignment master function. The switch fabric 240 sends each packet flow or request to an edge server 230 listed in the configuration of the switch fabric 240. The assignment can be performed by choosing the edge server 230 with the least amount of connections or the fastest response time. In some embodiments, the switch fabric 240 may assign the packet flow somewhat arbitrarily using round robin or random methodologies. When the chosen edge server 230 receives the packet flow, an algorithm may be used by the chosen edge server 230 to potentially reassign the packet flow between a group of edge servers to the one dictated by the algorithm. For example, the switch fabric 240 could choose a second edge server 230-2 being the next in the round robin rotation. The second edge server 230-2 could process the request and find that the first edge server 230-1 is being assigned this type of request. The request could then be reassigned to the first edge server 230-1 to fulfill.

As described above, the CDN 110 may be used to host content for others. Content providers 108 may upload content to an edge server 230 that hosts the content and functions as an origin server. After the content provider 108 places a content object in the CDN 110 it need not be hosted on the origin server 112 redundantly. Edge servers 230 can perform the hosting function within the CDN 110 with other edge servers 230 perhaps caching the same content that is hosted by another edge server 230.

Requests from end-user systems 102 are assigned to an edge server 230 that may cache the requested content object. On occasion, the edge server 230 receiving a request does not have the content object stored and available for immediate serving. This so-called "cache miss" triggers a process within the CDN 110 to effectively find the content object (or portion thereof) while providing adequate Quality of Service (QoS). The content may be found in neighboring edge servers 230 in the same POP 120, in another POP 120, or even an external origin server 112. The various edge servers 230 may be grouped for various URIs uniquely. In other words, one URI may look to one group of edge servers 230 on a cache miss while another URI will look to a different group of edge servers 230. In various embodiments, a particular URI could be assigned to one or more edge servers 230 in a single POP, multiple POPs or even in every POP. Generally, more popular content is stored on more edge servers 230 and more POPs 120.

When servicing requests from end-user systems 102, some form of content processing may be performed on the requested content before it is delivered from an edge server 230. In some cases, content processing may be performed by special software/hardware modules that are integrated with existing devices within the POP 120 or on the origin server itself 112. If the content processing is performed on an edge server 230 or on an origin server 112, the software/hardware performing the content processing may need to be distributed to each edge server 230 and/or each origin server 112.

As modern CDNs proliferate and become more complex, content processing may become more specialized and programming intensive. Embodiments described herein may disclose an intermediate content processing server that can be used to process and deliver content from edge servers 230 to the client systems requesting the content. One particular type of content processing that may significantly improve the user experience is content acceleration. Acceleration is an accumulation of processing techniques to optimize the end user experience when viewing web pages. The most interesting content in the web page may be sped up using a number of techniques. These techniques can optimize different portions of the delivery chain. For example, acceleration can optimize gathering information from the origin server along with accelerating how that information is provided to the client system. Acceleration can also optimize gathering content from other POPs. In some embodiments, frontend and backend acceleration engines can have additional caching functionality that is separately indexed.

Embodiments herein may use acceleration techniques that can speed up the delivery of content to a client system. Client systems may include the end-user systems of FIG. 1. While it is beyond the scope of this disclosure to exhaustively recite all possible acceleration techniques, a short overview of a number of different acceleration techniques may be provided herein to provide a sampling of different embodiments. It will be understood by one having skill in the art that these recited acceleration techniques are merely exemplary and not meant to be limiting. The embodiments described herein for selecting among a plurality of acceleration techniques based on attributes of the client system, delivery networks, and client software should be interpreted as being compatible with all possible web acceleration techniques.

Some acceleration techniques selected by embodiments described herein may include caching, or pre-caching, content based on predictive algorithms. Frequently accessed documents may then be sent to the client system at a faster transfer rate than a more remote edge server could provide. Similarly, cache refreshing techniques can ensure that frequently accessed content is available to client systems when it is most likely to be requested.

Many CDNs may resolve URIs in order to locate content on an edge server. Some acceleration techniques may preemptively resolve URIs that are identified in a webpage in order to reduce transfer time. The webpage may be pre-scanned or pre-processed to identify URIs in the HTML or JavaScript. In addition to preemptively resolving URIs, predictive algorithms may determine which content items are likely to be accessed in the near future and prefetch those documents to be delivered to the client system.

Some acceleration techniques may also use data compression in order to facilitate rapid data transfer. By preemptively compressing data packages, they can be delivered to client systems more efficiently. Images and other types of media files may be compressed such that their quality is reduced if they are not immediately viewable on a device's screen. In other cases, reduced quality images may be preemptively transmitted to a client device, and additional image information may be transmitted upon an actual request to re-create a high-quality image.

Many acceleration techniques used herein may edit or otherwise optimize the actual HTML or JavaScript used to define a webpage or access content. For example, content requests may be grouped together such that repeated requests are minimized. Requests for content stored in common locations in edge servers may also be grouped together. JavaScript may be edited such that the default conditions are immediately processed and available, while alternate conditional statements can be evaluated after a page is loaded. TCP acceleration techniques may also be used. For example, an edge server may maintain a persistent TCP connection between the client device and the edge server.

Figure 3A:
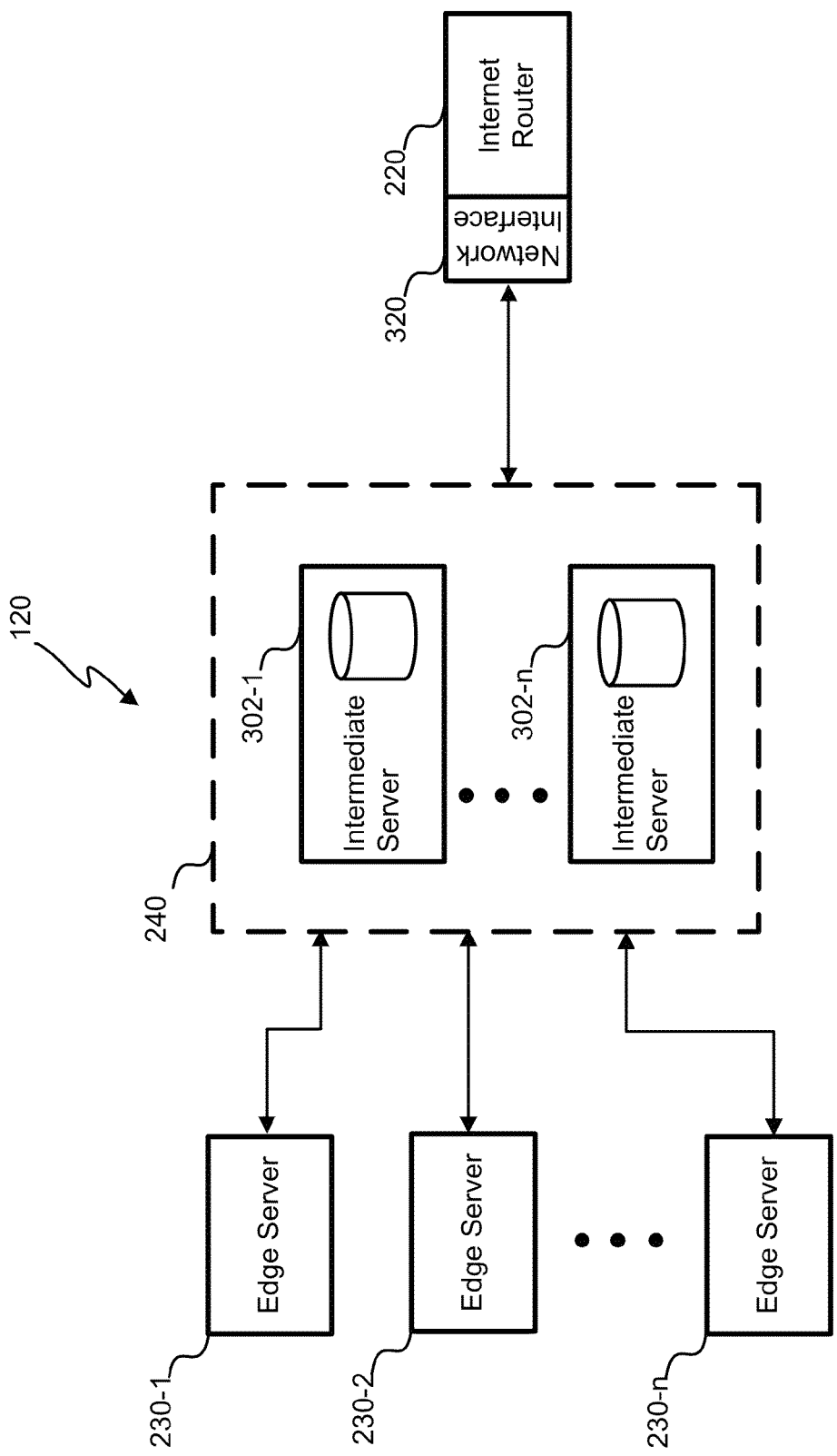
FIG. 3A depicts a POP arrangement with an intermediate server for accelerating content, according to some embodiments.

FIG. 3A illustrates a system for accelerating web-based content, according to some embodiments. The system may be part of a CDN, and may be located within one POP 120 of the CDN. The pop may be connected to other networks, including the Internet, through an Internet router 220. The Internet router 220 may have, or may also be referred to as, a network interface 320. The network interface 320 may be configured to receive requests from client systems for content, and to provide content from edge servers of the CDN to the client systems in response to such requests. The network interface 320 may generically refer to any gateway, router, interface, system, and/or terminal through which such requests are passed between client systems and any device on the CDN.

Within the POP 120 the switching fabric 240 may be communicatively coupled to one or more intermediate servers 302. The intermediate servers may also be referred to as a web page access accelerator (WPA), and acceleration server, a web accelerator, and/or the like. Instead of providing webpage content directly between the edge servers 230 and a client system, traffic may instead be routed through one or more of the intermediate servers 302 when the content can be configured for accelerated access. Accordingly, a request for webpage content may be directed through a particular one of the intermediate servers 302 that is equipped with various acceleration mechanisms as described herein. As the switching fabric 240 routes content requests and content deliveries through the POP 120, appropriate acceleration techniques may be identified by the intermediate servers 302, and these acceleration techniques may be applied to the content as it is routed to the client systems.

The intermediate servers 302 may include one or more acceleration engines configured to apply acceleration techniques. The intermediate servers may also include storage devices, such as hard disks, flash memory, databases, and/or the like that are configured to store instructions for carrying out the various acceleration techniques. The intermediate servers may also include communication interfaces configured to communicate with the edge servers 230 as well as the network interface 320 and/or Internet router 220.

Although many embodiments described herein make particular reference to edge servers within a CDN, the invention should not be limited to only CDN environments. Other embodiments may also include server farms of which the intermediate servers 302 are a part. Some embodiments may be implemented using cloud computing environments that deliver both content and application services. Some embodiments may be simple web servers equipped with web acceleration software.

Figure 3B:
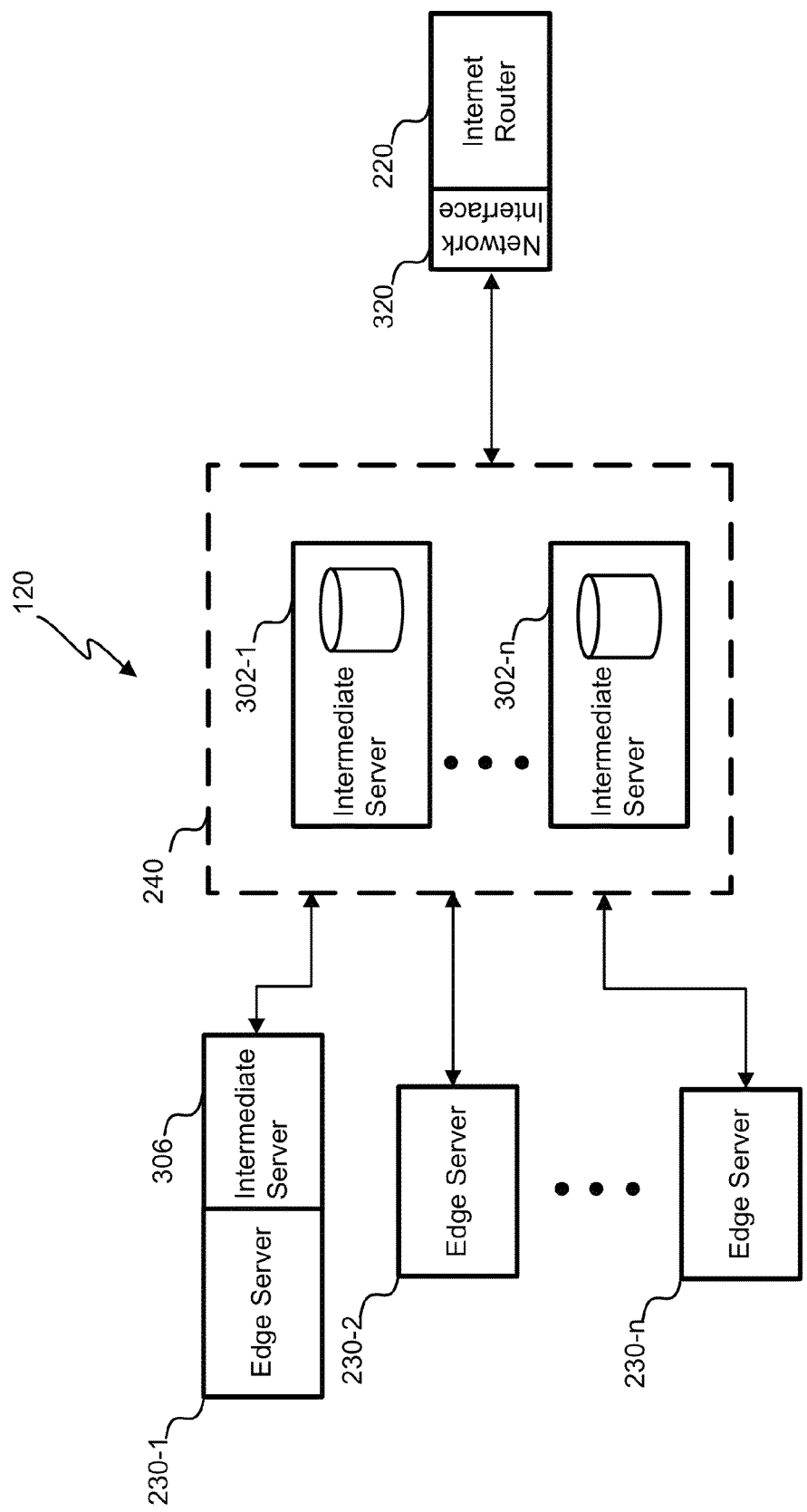
FIG. 3B illustrates an alternate system for accelerating web-based content, according to some embodiments.

Although FIG. 3A illustrates intermediate servers 302 that are separate from the edge servers 230, other embodiments may combine the intermediate servers 302 with the edge servers 230. FIG. 3B illustrates an alternate system for accelerating web-based content, according to some embodiments. The system of FIG. 3B may be very similar to that of FIG. 3A; however, one or more of the edge servers 230 may be physically or logically integrated together with an intermediate server. For example, edge server 230-1 could be physically or logically integrated with intermediate server 306. The two "servers" may share storage space, processing and computing resources, and communication ports. The two servers may be physically integrated together in the same server rack, or even in the same mainframe computing device. In some embodiments, the intermediate server 306 may be implemented in software and referred to as a web accelerator.

In this configuration, some edge servers may be integrated with intermediate servers while others are not. Content provided by edge server 230-1 may be accelerated by the intermediate server 306, as well as any of the other intermediate servers 302. For example, certain acceleration techniques may be implemented by intermediate server 306 that may apply only to content stored on edge server 230-1. After being processed by intermediate server 306, the content provided by edge server 230-1 may also be processed by intermediate server 302 according to different acceleration techniques. In other cases, edge servers that are not coupled with intermediate servers may send content to intermediate server 306 for processing. In other words, intermediate server 306 may accelerate content from edge server 230-1 as well as any of the other edge servers 230, depending upon the particular embodiment.

POP configurations according to FIG. 3A and/or FIG. 3B may be geographically distributed throughout the CDN. In some cases, web acceleration techniques may be distributed throughout the CDN. For example, web acceleration techniques that take place on edge servers or origin servers that are further away from the client system may be referred to as "back-end" acceleration techniques, while acceleration techniques that take place on edge servers that are closer to the client systems or that directly deliver content to client systems may be referred to as "front-end" acceleration techniques. Bifurcating the acceleration process between front-end and back-end systems is described fully in the commonly-assigned U.S. patent application Ser. No. 13/571,320 entitled "Inter Point of Presence Split Architecture" filed on Aug. 9, 2012, which is hereby incorporated by reference for all purposes.

Some acceleration techniques have been particularly designed to operate using the POP configurations according to FIG. 3A and/or FIG. 3B. Some of these acceleration techniques are described fully in the commonly-assigned U.S. patent application Ser. No. 12/848,611 entitled "Systems and Methods Thereto for Acceleration of Web Pages Access Using Next Page Optimization, Caching and Prefetching Techniques" filed on Aug. 2, 2010, which is hereby incorporated by reference for all purposes. For example, one acceleration technique may include prefetching resources of subsequent or additional webpage requests. Many of the resources are common to several or all the pages that may be fetched, and therefore pre-fetching such resources is likely to save fetching them for other pages. In some cases, the intermediate servers 302 can intercept webpage code and parse it prior to sending it out to client systems.

In some cases, after browsing a site for a while, newly-requested pages load very quickly because most of their resources are already in the browser's cache. The only non-cached items are the HTML itself and a few resources which have not been seen on previous pages yet. In such cases, loading the HTML from the network represents a large percentage of loading the entire web page, even when the HTML is loaded very quickly. Therefore, a script may be added that detects the mouse presence over a link, a button, or any other means of selecting a URL. This script may be enabled to detect whether the focus is on the link, button, or other control. After the detection, the script, might or might not wait a while to reduce the number of false positives, after which it pre-fetches the relevant page. If, during this time, the mouse moved from the location of a URL, or has otherwise lost its focus of the web page, the pre-fetch is canceled. If the page pointed to by the link is small and the server is fast, many times it is possible to bring the page to the browser's cache before the link is actually clicked, thus substantially reducing the load time of that page as it appears to the user.

Another acceleration technique may leverage the fact that on the same web site, many pages have common resources. A web page may be processed differently for a case where it was reached from within the web site compared to a case where it was reached from outside of the web site. The conclusion about how the page was reached may be determined according to the HTTP headers of the web page, a special cookie, the existence of a "referrer" header, a configuration, or any other technique. The intermediate servers 302 may intercept the webpage and send the client system to a different version thereof.

According to another acceleration technique, caching of dynamic data may include separating the static parts of the HTML page from the dynamic parts. This can be performed by, for example, "marking" parts of the HTML as static or dynamic, or automatically, by studying instances of the same page and deducing which parts are common. Once the static and dynamic parts of the page have been marked, this information can be used to accelerate page loading. First, the static part can be processed to achieve optimizations using techniques discussed in this document or otherwise, and the processed data may be kept in cache. Once a request for the page is accepted, the original page may be requested, and then the dynamic parts of it can be "applied" to the processed static parts. The resulting page can then sent to a client system. The static part, processed or not, can be sent to a client system from the cache, without requiring a request to the web server to obtain the original page. However, a code may be injected into the page which directs the browser, without any need of additional support, to asynchronously send additional requests to retrieve the dynamic data. When the addition data is retrieved, it can be injected into the DOM in the correct locations.

In another acceleration technique, resources may be intelligently cached. Every resource may be equipped with a version indicator, and this version may be increased every time the resource is changed. Every whole web page, i.e., a web page along with all its resources, may also have a version indicator. The version of the page, or an identifier that stands for this version, may be sent to the client system along with the web page every time it is requested. If the client system has already accessed that page, the version of the page received by the client system, or an identifier which represents the current version, may be sent with the request. In one embodiment, this may be achieved by using cookies. All the resources may be associated with a very long expiration time. Thus, when the browser encounters these resources it will be able to retrieve them from the browser cache.

In another acceleration technique, when a page is served by a web server or proxy, the pages that are candidates for being the next pages to be served for the same client system may also be processed. The candidate web pages can be deduced either statically from analyzing the current page, for example, by looking at all the links, or by collecting statistics and choosing accordingly. A configuration or a combination may be used, for example, by determining whether there are many links and ordering their processing according to calculated statistics. This can be done recursively to any depth and process may be located on all the selected pages.

Typically, pages of a particular web site will contain common data. In another acceleration technique, the common data between pages is sent only once. Only the non-common data of a page is sent to the user every time that the user requests a new page, while the common data is sent only once. The intermediate servers 302 may compute a difference between the requested pages and send only such differences to the client system.

As stated above, these acceleration techniques are merely exemplary, and not meant to be limiting. Many additional acceleration techniques may be used by embodiments described herein.

Embodiments described herein may focus on dynamically selecting a set of acceleration techniques from a plurality of possible acceleration techniques based on attributes associated with a content request. These attributes may indicate a particular connection type, a hardware description such as screen size and/or device type, a software characteristic such as browser type and/or browser version, a data carrier or ISP, a latency metric, a geolocation, and/or the like. Each of these attributes may cause particular acceleration techniques to be more or less effective, depending on how they are combined and evolving over time. Some embodiments may heuristically determine the optimal set of acceleration techniques for any client system configuration. The client system configuration may be determined by evaluating the received attributes and a set of acceleration techniques may then be applied dynamically as the request for content is serviced.

Currently, individual websites are analyzed extensively to determine which acceleration techniques should be applied when providing associated content in response to a client system request. The HTML code may be analyzed, the content objects may be analyzed, business rules may be applied to website content, JavaScript functions may be optimized, and/or the like. However, while the content and web code may be extensively analyzed and optimized on the server side of the transaction, current acceleration techniques are applied in a one-size-fits-all fashion to the many different client system configurations that may request content.

One problem with this approach is that many client system configurations may particularly benefit from some acceleration techniques that may not be universally applied on the server side. Other client system configurations may interfere with some acceleration techniques and thereby reduce their effectiveness, or even slow down the transaction.

Another problem is that it takes a tremendous amount of time and analysis to tailor a website to effectively use the currently available acceleration techniques. This process may take multiple months to complete. However, by the time a fully optimized website is made available using tailored acceleration techniques, client system configurations may have evolved to the point where the website acceleration scheme is now obsolete. Network characteristics and bottlenecks may have changed, new operating system versions may have been released, new network topologies and technologies may have been developed or improved, latency may have changed over time, browsers may have been upgraded, and/or the like. Each of these client system configuration changes may affect the optimization of the acceleration techniques that was painstakingly developed only a few weeks earlier.

For example, modern web browsers are now being equipped with acceleration techniques of their own to increase the speed at which web content is rendered in the browser display. Browser updates may be distributed to client systems rapidly and frequently. Some acceleration techniques used by browsers may interfere with acceleration techniques implemented by a CDN. For example, browser software may apply an acceleration technique whereby it stops downloading resources until it resolves a line of JavaScript. On the other end, the server-side HTML code may have been optimized to continuously execute JavaScript while content is downloaded. These two conflicting paradigms may act to cancel out the benefits of each to the detriment of the user experience.

In another example, certain acceleration techniques may be particularly useful in long-latency situations. Geolocations of the client systems that are far away from the corresponding edge server may be used as a proxy for latency in some situations. However, when a client system is located near the corresponding edge server in either a network latency or geographic sense, acceleration techniques used to reduce latency may simply add unnecessary overhead to the content transmission. A fast network that is very close to the data origin edge server may actually be slowed down by using acceleration techniques, such as image bundling. Counterintuitively, the best acceleration technique may be to do nothing for the limited subset of customers who are close to the data origin.

In another example, device characteristics of a client system may make some acceleration techniques more useful than others. Depending on the screen size, processing power, and/or operating system, content can be optimized accordingly.

Currently, acceleration techniques require developers to bet on the right techniques to use given the commonly used browsers, networks, and devices at the time of development. However, once websites are rolled out that implement the selected acceleration techniques, the website may be only two to three months from being obsolete given the rapid change in client system configurations and transmission networks.

Therefore, the embodiments described herein may analyze each request individually as they are received. The content request may include or may be otherwise associated with attributes. These attributes may be associated with the transmission network, a request type, device characteristics, and/or the like. For each particular request, the attributes may be analyzed, and a a set of acceleration techniques may be selected from a group of possible acceleration techniques and applied on a per-request basis.

By analyzing each request individually, the best set of acceleration techniques may be applied and the user experience can be improved. For example, a user may request a webpage using a desktop computer connected through a T1 connection with a 1024×2048 screen size. These attributes may dictate that a first set of acceleration techniques may be used. The same user may next request the same website using a smart phone connected through a mobile 4G network with approximately a 2"×4" screen size. Even though the user may be sitting in the same room for both requests, the second request to the smart phone for the same website may utilize a completely different set of acceleration techniques that are applied in real time as the request is serviced by the content delivery network.

Figure 4A:
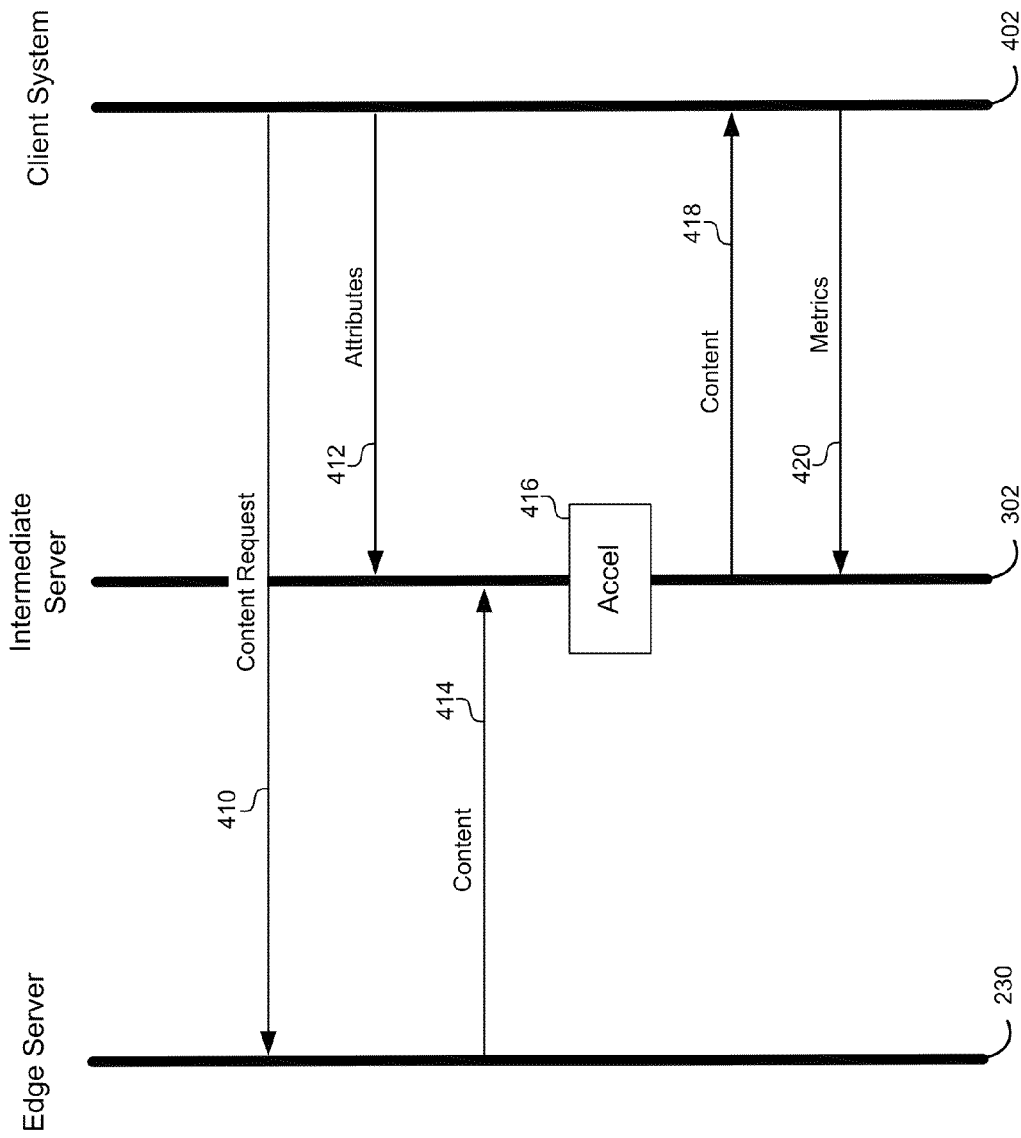
FIG. 4A illustrates a flow diagram of content requests and responsive content processed by an intelligent acceleration system, according to some embodiments.

FIG. 4A illustrates a flow diagram of content requests and responsive content processed by an intelligent acceleration system, according to some embodiments. A client system 402 may send a content request to a website. For example, a user may enter a URL into a navigation field of a web browser or may click on a link within a web browser. In some cases, the web browser may be directed to a website at an origin server, and the origin server may redirect the request or portions of the request to locations within the CDN. Alternatively, elements of the URL itself may direct the web browser to first contact the CDN.

The CDN may receive the request for content and may intelligently determine the best edge server(s) to provide the content. A particular edge server 230 may be identified and receive the content request (410). Note that FIG. 4A illustrates the content request originating from the client system 402 and eventually reaching the edge server 230. The intermediate transactions that may involve an origin server and other server/devices within the CDN have been omitted for clarity.

As the content is sourced from the edge server 230, the CDN may pass the content through an intermediate server 302 as described above. Note that in some embodiments (not shown) the function of the intermediate server 302 may be implemented on the same physical hardware as the edge server 230. The intermediate server 302 may intercept the content (414) and apply one or more acceleration techniques (416).

The intermediate server 302 may select the acceleration techniques to apply from a plurality of available acceleration techniques. The selection process may be based on attributes that are associated with the request. In one embodiment, the attributes may be transmitted from the client system 402 to the intermediate server 302 directly (412). The intermediate server 302 may intercept the request and extract attributes therefrom. The intermediate server 302 may also directly query the client system 402. In some embodiments, JavaScript generating a URL for the client system 402 may also be configured to provide information to the intermediate server 302. In some embodiments, the attributes may be automatically determined based on the content request. For example, an IP address associated with the content request may be analyzed to determine a geolocation. Some embodiments may query a third-party service to obtain information associated with the IP address, such as a business, a connection type, and/or the like. Network timing information may be ascertained to determine a latency metric. "Pings" may also be sent between the CDN and the client system to determine the latency metric. Tags provided in the request may identify a browser type and/or client system configuration. Other techniques for ascertaining attributes not specifically listed may also be used. The acceleration technique selection process and the particular attributes that may be used will be described further herein below.

The intermediate server 302 can then apply the selected acceleration techniques to the content and provide the content to the client system 402 using the selected acceleration techniques (418). In this configuration, neither the edge server 230 nor the client system 402 need be aware that the intermediate server 302 is applying acceleration techniques to the content during delivery. Therefore, different acceleration techniques and intermediate servers 302 may be swapped in and out of the CDN as they are developed or become obsolete.

In some embodiments, there may be a feedback loop associated with the content delivery to client systems 402. The feedback loop may collect metrics describing the speed and correctness with which the content was provided and displayed on the client system 402. Generally, two different types of metrics may be provided. First, metrics related to latency may be collected. Second, metrics related to how correctly the website/content was displayed on the client system may be collected.

Webpage metrics may be gathered by a number of different means. In one embodiment, the load sequence of a typical web page may include many different resources. Some of the resources may be visible while others may not be visible. Therefore, some of the visible resources may be part of the viewport while others are not, depending upon the screen size and/or the device type. Additionally, the speed at which a web page loads may be measured as perceived by a user once the viewport is complete. It is therefore very difficult to deduce when the page has finished loading from the user's point of view based merely upon network analysis. Current measurement techniques either calculate this time once all the components of the page have finished loading, including those that are invisible, or check the "onload" event of the HTML document, which also has only a small correlation to the actual user perceived load time.

In most websites, the last item to be loaded in the viewport is a graphic item, such as an image or a Flash object. This happens because the size of graphic items is relatively large and takes more time to load than the smaller-sized components. Therefore, graphic items are often loaded later than the textual, i.e., HTML, JavaScript, CSS, etc., elements. Using this assumption, the actual perceived load time of the page may be estimated.

For every background image, the server may create invisible dummy images that are marked as loaded when the background image finishes loading. The time the page starts loading is saved in memory. Once every predefined time interval (which can be set to different values depending on the desires granularity of the result) all of the graphical elements of the web page can be checked, for example, by scouting the DOM of the web page, by lists exported by the browser such as document images, or by any other means. The elements can be images, Flash objects, or any other type of element. For every element found, its position may be calculated, for example, by using all the elements starting from the selected element and finishing at the root of the DOM tree. If the element's position is in the viewport, it is added to the known viewport element list.

A graphical snapshot of the screen can be stored that may contain only the browser, or any other part of the screen, along with the elapsed time passed since the start load time. These snapshots can be later analyzed to determine the exact time the viewport has finished rendering. This process can be repeated for all known elements in the lists previously created. The load time can then be estimated, stored, and later retrieved by the intermediate server for analysis.

Another method of retrieving metrics related to site loading times and correctness may involve fingerprinting sites. A fingerprint for each website can be generated based on a number of images, types of JavaScript, length of HTML code, number of linked sites and/or content, advertising sources, and/or the like, in order to generate a unique signature for each webpage. The fingerprint generation algorithm could be invoked at regular time intervals as the webpage is loading and compared to the known fingerprint. When the current fingerprint of the webpage sufficiently matches the known fingerprint, the webpage may be considered loaded from the user's perspective.

Another method of retrieving metrics related to site loading times and correctness may involve using a browser API that implements the standard Navigation Timing Specification provided by W3C. The Navigation Timing Specification is a Java API detailing the timing information of the page load. Available in most newer browsers, it helps developers test user experiences remotely. The Navigation Timing Specification can be used to retrieve metrics such as the time when the user begins a navigation to a new page, a time when the first requested page returns to the browser, the time when the page is then parsed into a DOM, the time when the page has completed loading, and/or other timing-related information.

Newer browsers may also use the W3C Resource Timing Specification. While the Navigation Timing Specification addresses timing information associated with a navigation event, the Resource Timing Specification interface may allow JavaScript mechanisms to collect complete timing information related to resources within a webpage. The specification may be particularly useful for resources within a single webpage that are stored as content objects at various servers within the CDN. The Resource Timing Specification may be used to determine when each image or other content object on a webpage is loaded by retrieving the XY coordinates and the load times of every object on a webpage. An intermediate server could then perform an in-memory simulation of the page rendering and determine overall load times and metrics.

Another method for measuring metrics related to site loading times and correctness may involve taking screenshots and comparing RGB histograms of the webpage as it is loaded to known values. By comparing the incremental screenshots to a known RGB histogram value of the webpage when it is completely loaded, a numerical score can be derived representing the difference between the first and last RGB histogram to determine how far along the webpage is in the download and rendering process. In some embodiments, this value may be between 0.0 and 1.0. These values can be plotted over time to form a visual curve, the area above which can be calculated as a metric of how quickly the the webpage, or a part of the webpage, has been loaded that is visible to the user.

Using RGB values may be difficult to receive through a beacon-type data response because it may require screenshots rather than numerical values. However, the RGB values have been found to be related to numbers available through the W3C timing specifications. The numbers available through the timing specifications are easier to receive through a beacon-type data response. These numbers may then be used as a proxy to determine approximately what the RGB values would be for the visual portion of the webpage.

As used herein, a "beacon" may include any software routine configured to send information from the client system to a content source, CDN, edge server, and/or intermediate server where the information includes metrics on webpage load times and/or correctness. For example, a beacon may include a small snippet of JavaScript at the bottom of a source code page of HTML for a website. The JavaScript may post values to the intermediate server or may store values for later retrieval. The beacon may wait for a time interval after the page is finished loading so as not to compete for resources and affect the loading of the webpage. In some embodiments, the browser may make an AJAX call to send metric information using XML back to the intermediate servers. This information may also include coordinates of each image on the page, which can then be analyzed to determine whether they were correctly loaded.

Many of the methods described in the preceding paragraphs for retrieving timing-related metrics from a webpage may also be used to provide metrics related to the correctness with which a webpage is rendered on the client system. For example, final RGB values of the webpage may be transmitted and compared to an expected RGB value. The beacon may transmit XY coordinates for each of the images and/or text segment on webpage, and these values may be compared to expected values. It should also be noted that the Resource Timing Specification may be used to retrieve the XY coordinates of every object on a webpage in addition to retrieving the load times. In some embodiments, the beacon may acquire periodic screen captures or snapshots of the webpage as it is loading on the client device. The screen captures can be transmitted back to the intermediate server, or alternatively, values derived from the screen captures can be transmitted back to the intermediate server. For example, the above-described fingerprint may be derived from a screenshot and send back to the intermediate server to be compared to an expected value. Other methods may also be used to retrieve metrics related to correctness.

Figure 4B:
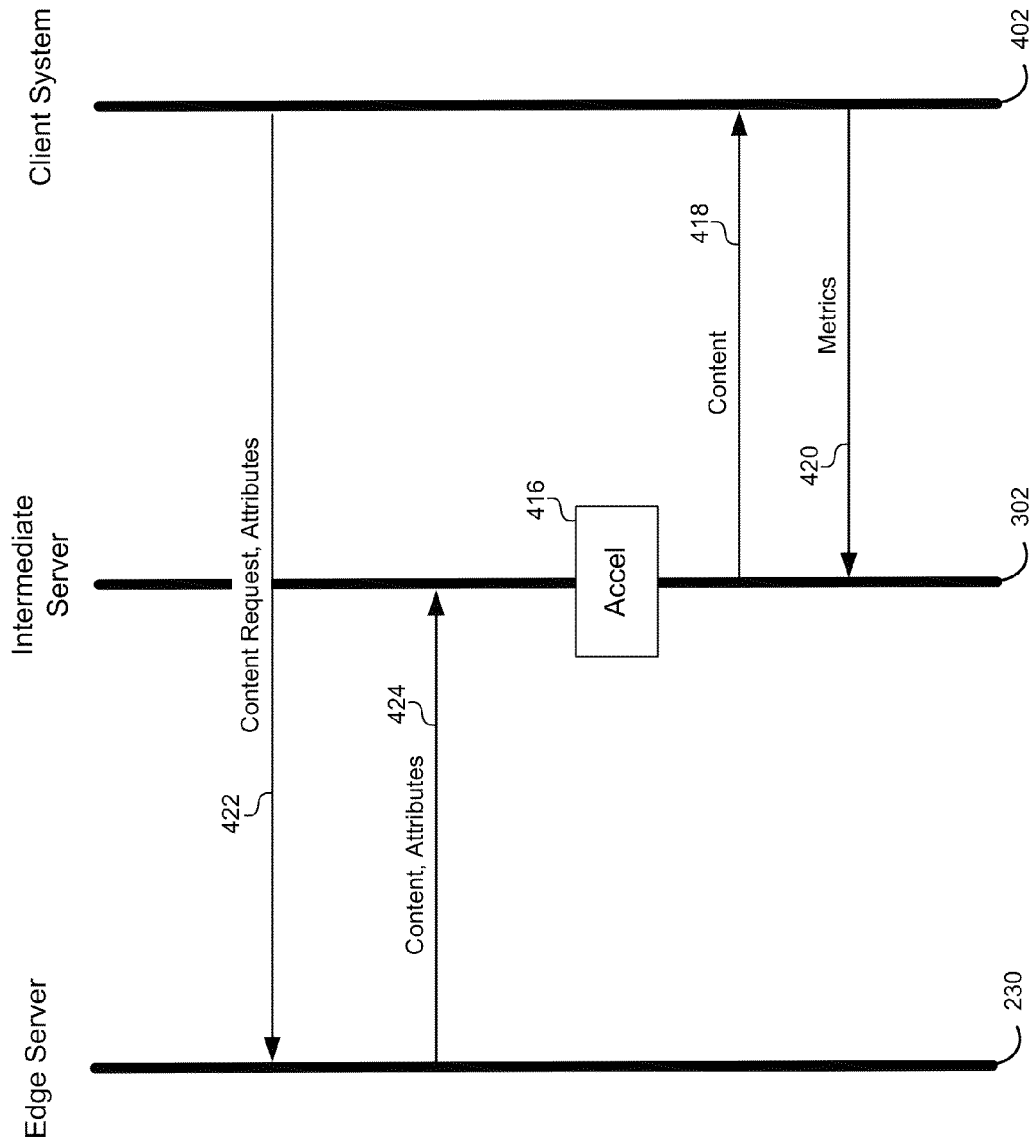
FIG. 4B illustrates a second flow diagram of content requests and responsive content processed by an intelligent acceleration system, according to some embodiments.

FIG. 4B illustrates a second flow diagram of content requests and responsive content processed by an intelligent acceleration system, according to some embodiments. This flow diagram may be very similar to the flow diagram of FIG. 4A. In this case, the attributes may be sent as part of the original content request (422). When servicing the content request, the edge server 230 may send the content along with the attributes to the intermediate server 302 (424).

Figure 5:
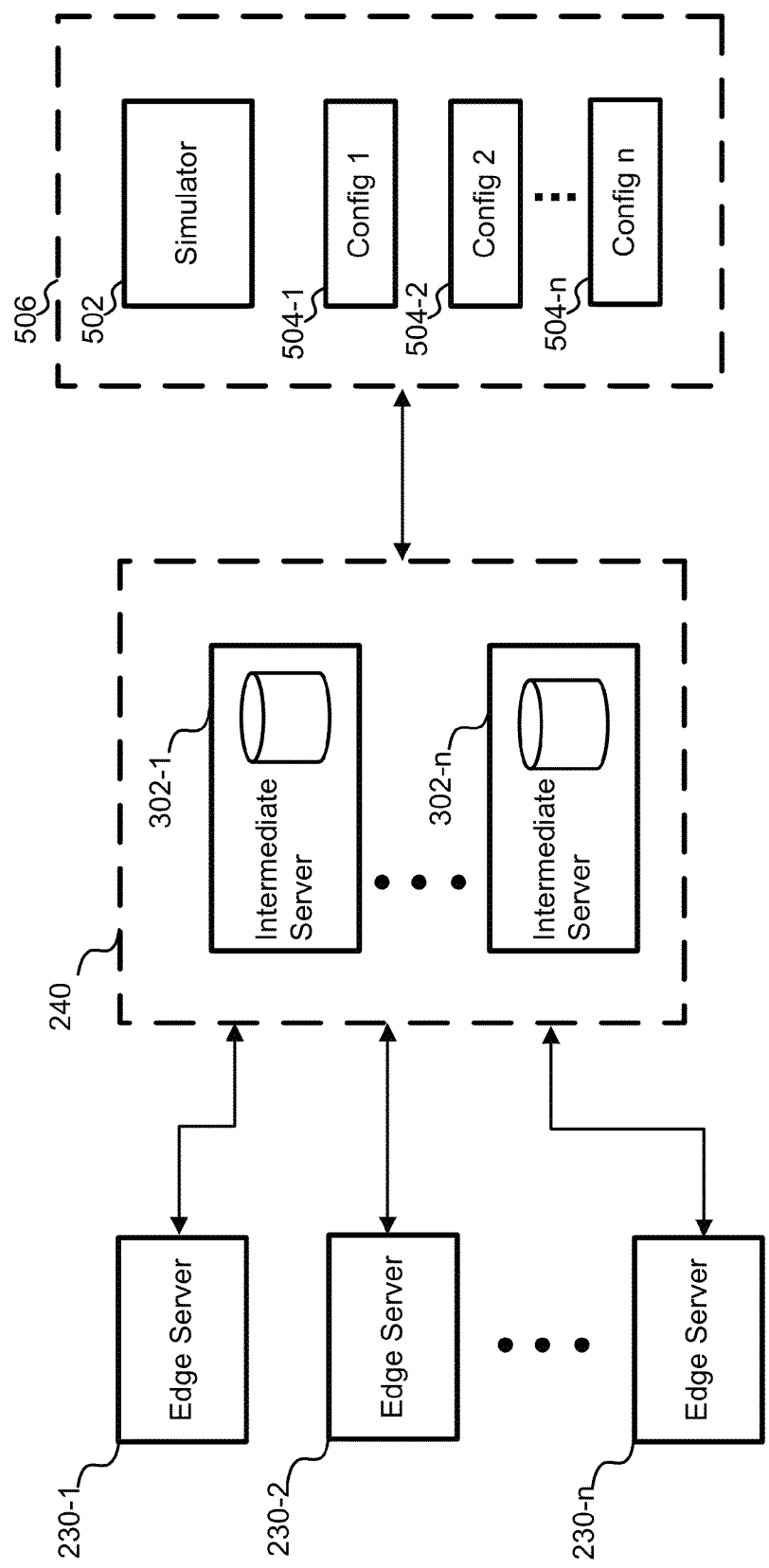
FIG. 5 illustrates a system for simulating webpage load times, according to some embodiments.

FIG. 5 illustrates a system for simulating webpage load times, according to some embodiments. In the systems of FIG. 4A and FIG. 4B, the metrics in the feedback loop are supplied by actual client systems making requests for content from the CDN. In contrast, the system of FIG. 5 receives metrics in the feedback loop from a testbed simulator 506. In one embodiment, a customer's website may be analyzed according to the traditional methods of identifying acceleration techniques on the server side. The acceleration techniques may be used as a default or baseline set of techniques before beginning the runtime analysis.

The simulation testbed 506 may include a simulation engine 502 configured to mimic a client system making requests for content such as a webpage from the CDN. The simulation engine 502 may receive as inputs a plurality of different configurations 504 that may be used by real-world client systems. Each of the configurations 504 may be run by the simulation engine 502 and may provide a request to the CDN for content. From the perspective of the CDN, the request may be indistinguishable from real-world client system requests. In other words, the request may be routed to edge servers 230 and content may be routed through one or more intermediate servers 302 where acceleration techniques may be selected based on the attributes of the particular configuration under simulation.

A configuration may include the attributes that are used by the intermediate servers 302 to select from among the available acceleration techniques. For example, a configuration may include attributes that indicate a particular browser type or version. A configuration may also include attributes that indicate a particular type of computer system. A configuration may also include attributes that include network latency, network type, ISP, or mobile provider. A configuration may also include hardware specifications, such as a screen size, memory size, processing power, and/or the like. A configuration may also include an attribute indicating whether the client system is using mobile cellular technology or a fixed landline device. A configuration may also include an attribute indicating client-side acceleration techniques that may be used by the client system. In short, configurations may include any or all of the attributes described herein that may be used by the intermediate server 302 to select acceleration techniques.

When the simulation testbed 506 receives the content from the CDN, the simulation engine 502 may download the content and render the content as it would be rendered on a corresponding real-world client system. One advantage of the simulation testbed 506 over using metrics collected from real world client systems is that a more complete set of metrics may be available. For example, the simulation testbed 506 may collect precise loading times, as well as precise image locations and granular timing data for each content object loaded in a webpage.

In many cases, customers of the CDN may supply their website and content objects to the CDN to be heuristically optimized using the simulation testbed 506. Each intermediate server 302 may be loaded with a lookup file that is populated using the results of the simulation testbed 506. The lookup file may be indexed using an identifier for the particular website or content object and the attributes associated with the content request. The lookup file may then return a particular set of acceleration techniques that have been identified as optimal for the particular client system configuration.

Figure 6A:
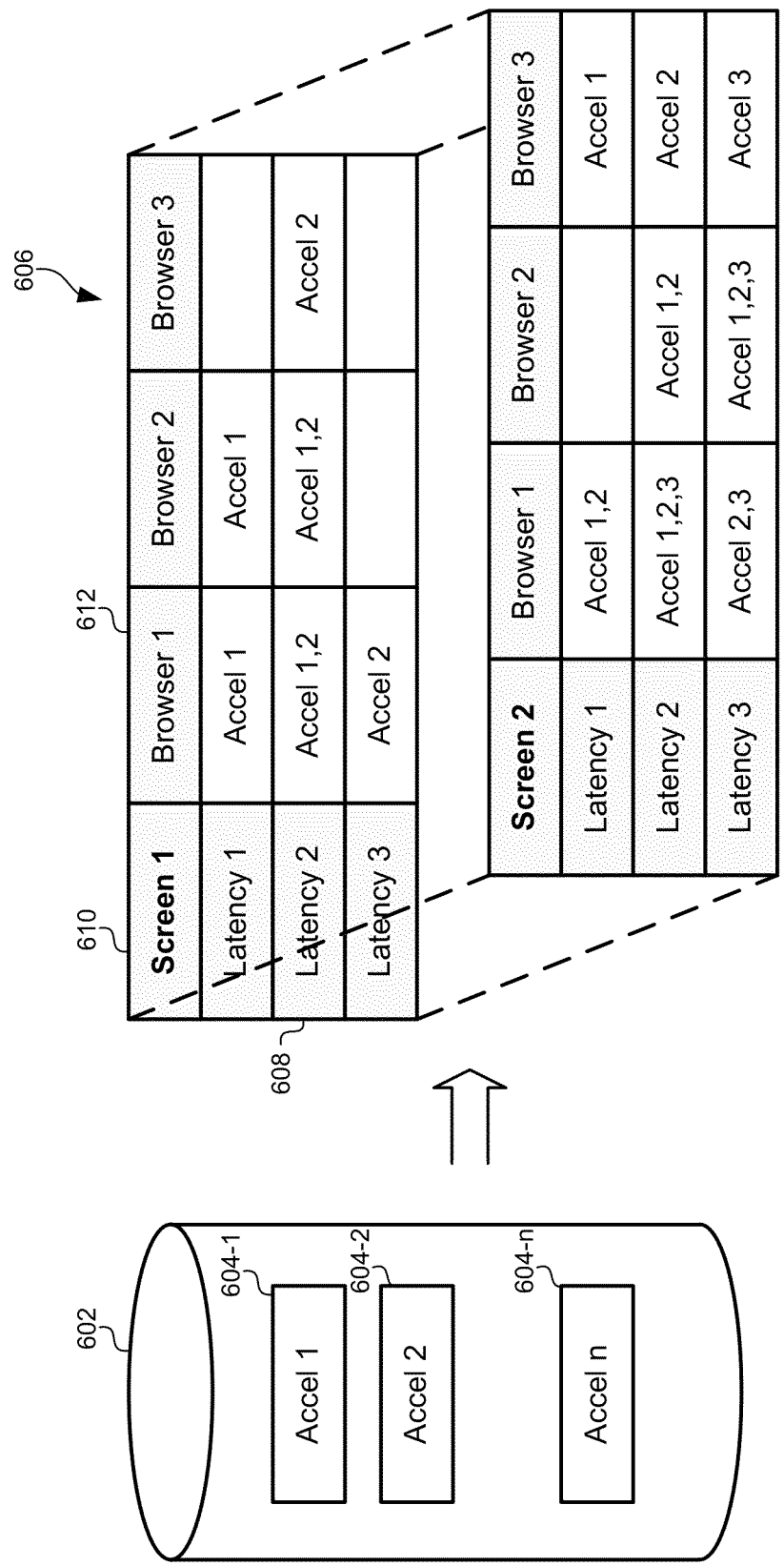
FIG. 6A illustrates a lookup file for determining the optimal set of acceleration techniques based on attributes associated with a content request, according to some embodiments.

FIG. 6A illustrates a lookup file for determining the optimal set of acceleration techniques based on attributes associated with a content request, according to some embodiments. A memory element, such as a database 602, may be configured to store instructions that cause the processor to execute one or more acceleration functions 604. Each acceleration function may be independent of the others such that multiple acceleration functions may be applied to a single content object. Additionally, some acceleration functions may be dependent on others such that certain acceleration function should be paired or executed in a certain order.

A look up table 606 may be comprised of a multidimensional data structure, such as a data cube or multidimensional array. Lookup table 606 may include a dimension corresponding to each attribute use by the intermediate server(s) to select acceleration functions. In this example, the lookup table 606 includes at least three dimensions. The first dimension may correspond to to a browser type 612. The second dimension may correspond to a latency measurement 608. The third dimension may correspond to a screen size 610. It will be understood that these three dimensions are merely exemplary and not meant to be limiting. In practice, many other dimensions may also be used that correspond to attributes associated with the content request.

In some embodiments, one dimension of the lookup table 606 may represent detected proxy configurations associated with the client system. For example, some embodiments may detect whether a client system is behind a transparent proxy and use this information to select acceleration techniques. Proxies may apply their own acceleration techniques or filter unrecognized or unexpected data from their data streams. Therefore, understanding proxy information related to a client system can be beneficial in selecting acceleration techniques. In some cases, proxies may control access to certain geographic locations such as countries like China. Acceleration techniques may be selected based on the behavior of these control proxies, and take into account any access controls or data filtering operations conducted by the proxies.

In some cases, dimensions may be subdivided into discrete values. For example, the browser type 612 may be divided into discrete values, each of which corresponds to a particular browser type, such as Microsoft™ Internet Explorer, Google™ Chrome, Mozilla™ Firefox, and/or the like. In other cases, dimensions representing continuous or near continuous values may be quantized into discrete buckets. For example, the latency measurement 608 may be received as near-continuous time values. Depending on the number of subdivisions within this dimension, the time domain may be quantized into a series of buckets. For example, Latency 1 may represent 0 to 100 ms, Latency 2 may represent 100 ms to 200 ms. Latency 3 may represent more than 200 ms, and so forth.

Each entry in the lookup table 606 may include an indication of which acceleration functions should be used for the corresponding set of attributes. When content responsive to a request is received by the intermediate server, the attributes associated with the request may be used to index a set of acceleration functions in the lookup table 606. For example, a request associated with Browser 2, Latency 3, and Screen 2 may correspond to acceleration functions 1, 2, and 3. Each entry in the lookup table 606 may include a designation of acceleration functions, as well as an order in which they should be applied.

Figure 6B:
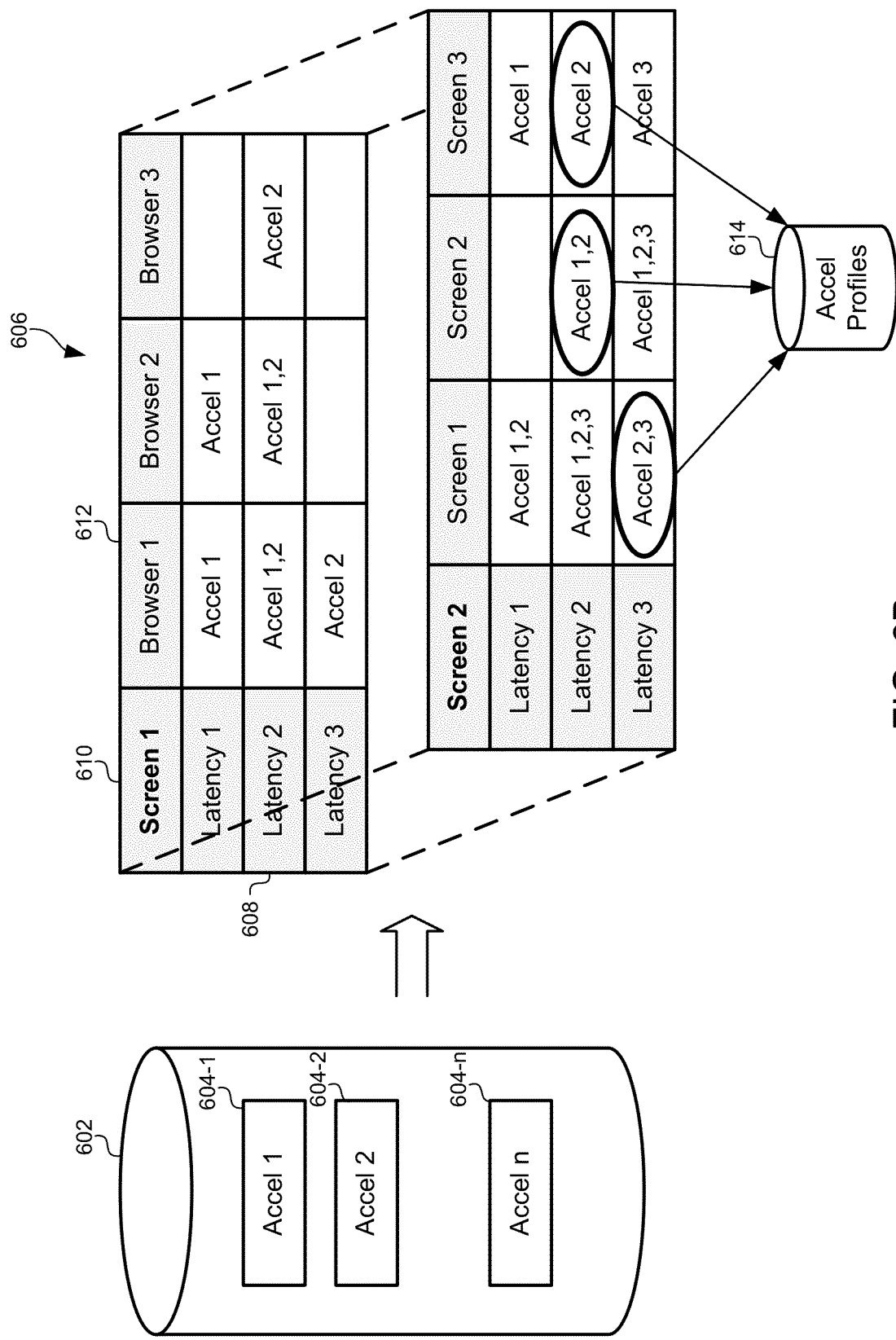
FIG. 6B illustrates a lookup file using acceleration profiles, according to some embodiments.

FIG. 6B illustrates a lookup file using acceleration profiles, according to some embodiments. Such acceleration techniques selected from the plurality of acceleration techniques may be grouped together to form acceleration profiles. Instead of listing acceleration functions and the order and manner in which they are applied, each entry in the lookup table 606 may instead reference acceleration profile. In some embodiments, the acceleration profiles may be stored in an acceleration profile database 614.

When a content object is initially stored in the CDN. A lookup table 606 may be constructed using attributes that are expected to affect the transmission of the content object. The lookup table 606 may be populated using default acceleration profiles that are believed to be the most effective for the particular configurations based on past experience or the predictive intuition of the designer. The default acceleration profiles may initially be used to provide the content object to client systems. Alternatively, the default profiles may be used as a starting point for operating within a simulation testbed.

As feedback metrics describing the load time and correctness of the content object are received, the lookup table 606 may be dynamically adjusted to optimize the acceleration profiles assigned to each entry in the lookup table 606. If the received timing and/or correctness metrics indicate that the default acceleration profile is performing worse than expected, a new acceleration profile may be generated that combines acceleration functions 604 in ways that remedy the performance shortfall.

As timing and/or correctness metrics are received over time, the entries in the lookup table 606 may be continuously adjusted. Therefore, a content provider, such as a website owner, may make continuous changes to their website content and the acceleration system of the CDN will automatically adjust itself to continually optimize the acceleration techniques applied for each client system or request type. The content provider need not inform the CDN when changes are made to the website, nor does the CDN need to detect when changes are made to the website. After a website change, the received metrics may indicate that some of the acceleration profiles in the lookup table 606 are no longer optimal, and adjustments can be made on the fly.

In addition to updating acceleration profiles, the lookup table 606 itself may also be restructured. Attribute categories may become irrelevant as technology evolves and may be substituted, added, or removed from the lookup table. For example, screen size may may play a smaller role in acceleration technique performance in some embodiments. The screen size entry 610 in the lookup table 606 may be replaced with another attribute type, such as geolocation, network type, and/or the like.

In some embodiments, different versions of a lookup table may be available for particular customers. For example a customer account may be associated with a level of service that the user has chosen to pay for. More expensive service levels may offer a more expansive set of acceleration techniques or acceleration profiles that combine acceleration techniques in unique ways or allow for more acceleration techniques to be applied.

Figure 7A:
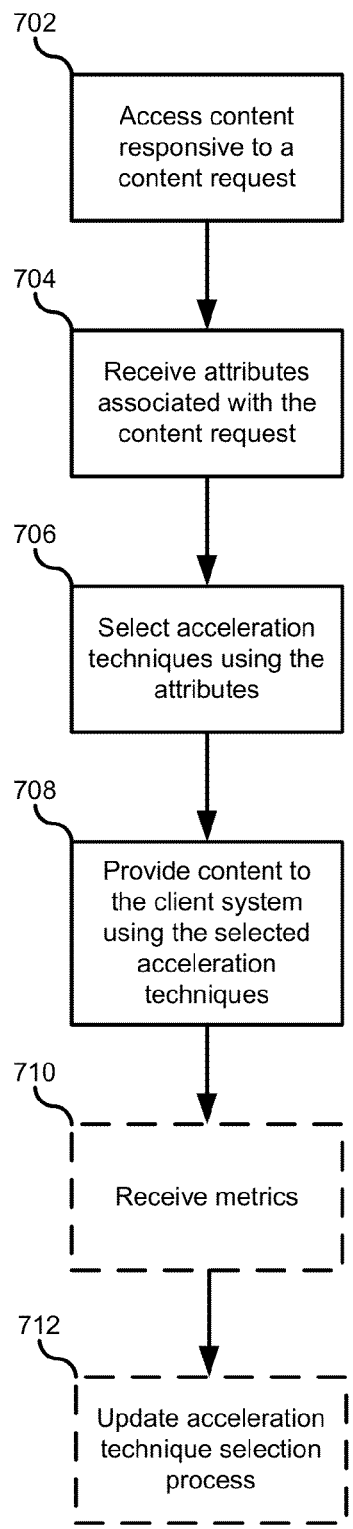
FIG. 7A illustrates a flowchart of a process for selecting acceleration techniques based on attributes associated with the content request, according to some embodiments.

FIG. 7A illustrates a flowchart of a process for selecting acceleration techniques based on attributes associated with the content request, according to some embodiments. This process may be carried out by an intermediate server, or acceleration server. Alternatively, this process may be carried out by an edge server that is configured to apply acceleration functions to content as it is provided to a client system. The method may include accessing content responsive to a content request (702). If the content is provided by an edge server to an intermediate server, the intermediate server may access the content as it is provided by the edge server. Alternatively, if the edge server is performing this function, then the content may be accessed as it is stored at the edge server and provided to the client system.

The method may also include receiving attributes associated with the content request (704). The attributes may be provided as part of the content request. The attribute may also be provided directly by the client system in a separate transaction from the content request. The attributes may also be stored locally on the intermediate server or the edge server. For example, a content request may be identified using an IP address. The IP address may then be used to look up a set of attributes associated with content requests from the requesting client system. The stored attributes may be been provided in the past during a registration procedure, or in association with prior content requests. Some attributes may also be received from third parties, such as entities that provide business information, connection information, and/or latency associated with a particular IP address. As described above, the attributes may include information descriptive of a screen size, a network type, a device type, a latency measure, a geolocation, and/or any other type of information that may affect how the selected acceleration techniques perform.

The method may also include selecting acceleration techniques based on the attributes (706). In some embodiments, the attributes may be used to select a set of acceleration techniques stored as an acceleration profile. In some embodiments, the selection acceleration techniques may be based on information in addition to the attributes. For example, network load statistics, load balancing requirements, storage space availability, and/or other characteristics of the CDN may be used to select acceleration techniques.

The method may further include providing content to the client system using the selected acceleration techniques (708). The edge server and/or intermediate server may process the content according to acceleration techniques. In some cases, this may involve creating a new version of the content object, such as an HTML source file, that is optimized according to one or more of the selected acceleration techniques. Therefore, multiple versions of the content object may be stored, each of which corresponds to one or more acceleration profiles associated with the original content object.

Where a feedback loop is operational, the method may additionally include receiving metrics that are descriptive of the timing and/or correctness with which the content object was received and loaded by the client system (710). Any of the techniques described above herein may be used to receive these metrics. The method may further include updating the acceleration technique selection process based on the metrics (712). This step may include adding or replacing acceleration profiles in a lookup table. This step may also include changing the attributes that are used in the selection process. In some cases, this step may include creating new pre-cached content objects that correspond to new acceleration profiles.

Figure 7B:
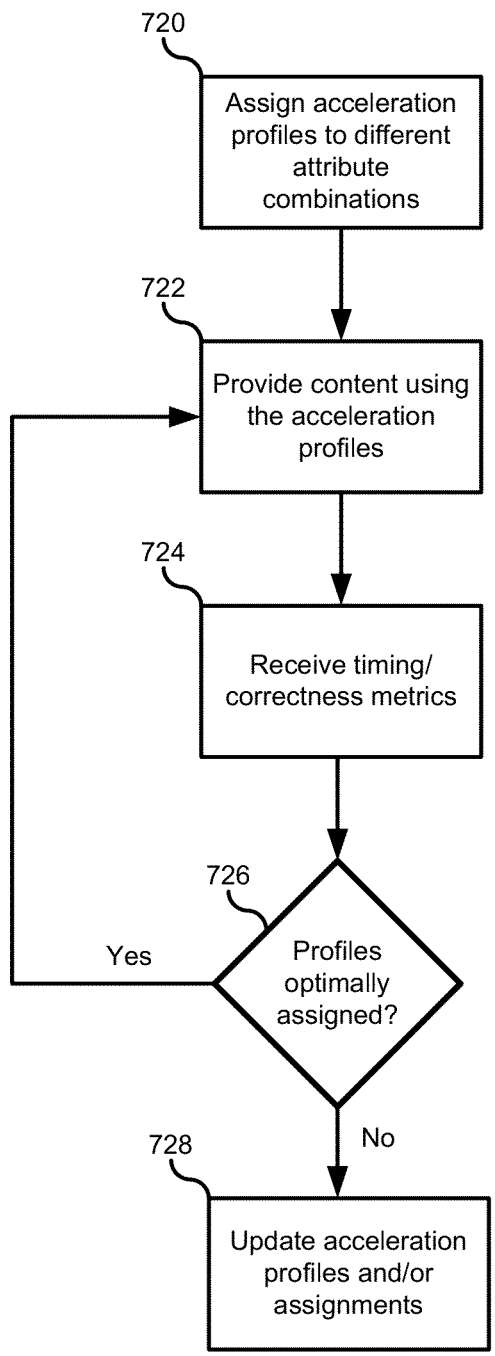
FIG. 7B illustrates a method of optimizing acceleration profiles based on attributes and metrics, according to some embodiments.

FIG. 7B illustrates a method of optimizing acceleration profiles based on attributes and metrics, according to some embodiments. The method may include assigning acceleration profiles to different attribute combinations (720). These acceleration profiles may be comprised of one or more acceleration functions, or acceleration techniques. Each acceleration profile may also include instructions describing how the acceleration technique should be implemented, including an order in which they should be implemented. The acceleration profiles may populate a lookup table that is indexed by the various attribute combinations. These initial acceleration profiles may be default profiles, and may be assigned based on historical information stored and analyzed within the CDN. The initial acceleration profiles may also be assigned based on administrator preferences, client system preferences, or user subscription account levels.

In some embodiments, the method may also include inserting new acceleration techniques into one or more of the acceleration profiles or entries in a lookup table. This method may be useful in testing the effectiveness of new acceleration techniques in various client system configurations. For example, a new acceleration technique may be inserted into each of the lookup table entries in order to analyze its performance in each system configuration type. In some cases, testing new acceleration techniques can be limited to a testing environment and restricted from live use with real client systems. Therefore, the method may include detecting whether a testing environment is operational, and selectively activating new acceleration techniques while the testing environment is active. The method may also include detecting when real client systems are being serviced by the intermediate server, and selectively deactivating new acceleration techniques accordingly.

The method may also include providing content using the acceleration profile (722). The content may be provided to actual requesting client systems. Alternatively, the content may be provided to a simulation test bed that simulates various client system configurations and network connections for the purpose of optimizing the process for selecting among the various acceleration techniques. In some cases, simulation data may be combined with real-world data in the optimization process.

The method may further include receiving timing and/or correctness metrics (724). As described above, these metrics may include any information that indicates timing events associated with loading the content object on the client system. These metrics may also include information describing how correctly the content object was rendered, displayed, or made available by the client system. These metrics may be received around the time when the content is provided to the client system or testbed simulator. Alternatively, these metrics may also be received later after the client system or testbed simulator has finished processing the requested content.

The method may additionally include determining whether the profiles are optimally assigned (726). This determination may be made by comparing the receiving metrics to threshold values. These threshold values may be expected values determined statistically for each combination of acceleration techniques. The threshold values may also be based on historical data collected and analyzed within the CDN. If the metrics fall within an acceptable range in relation to the threshold values, the method may again provide content using the acceleration profiles in response to different attribute combinations provided by the simulation testbed or client system. Alternatively, if it is determined that the acceleration profiles are not optimally assigned, the acceleration profile under test may be updated or reassigned in order to provide a better combination of acceleration techniques (728). The acceleration profile under test may be edited according to a sequence of possible acceleration techniques determined experimentally using historical and/or statistical data from within the CDN.

Figure 8:
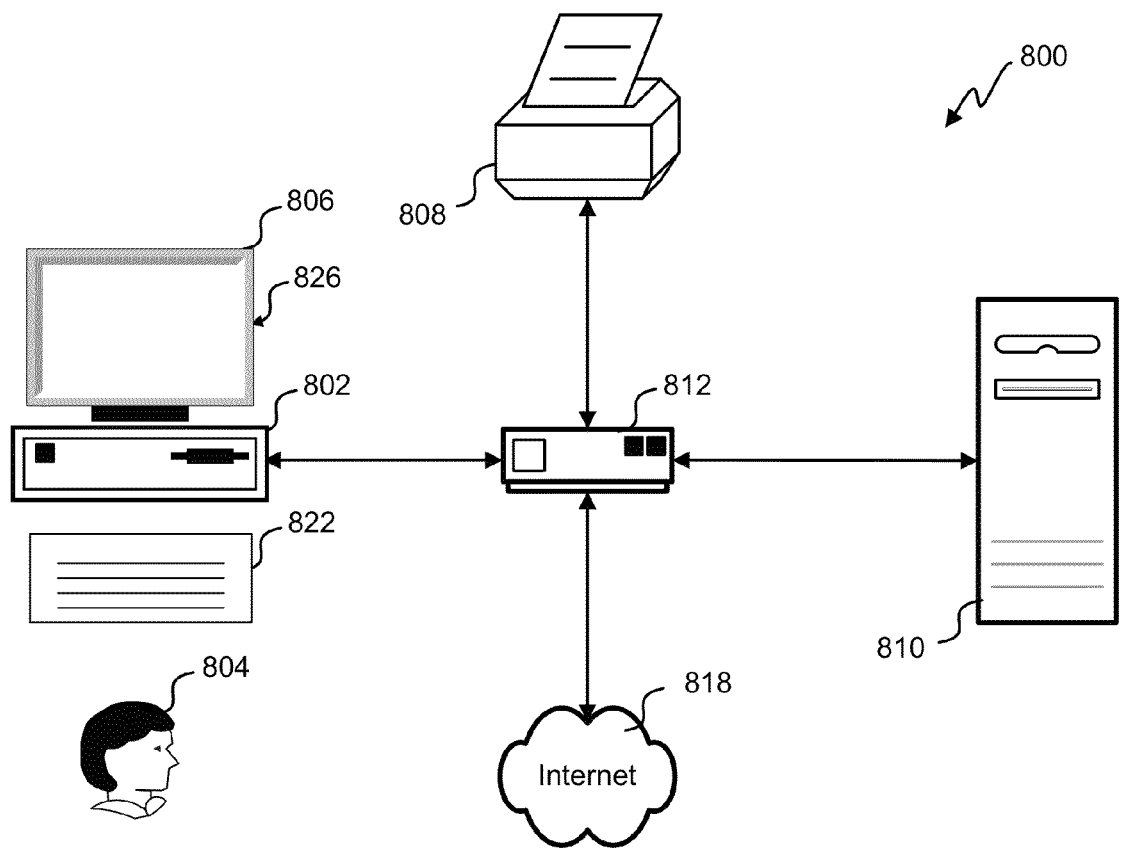
FIG. 8 illustrates an exemplary environment in which some embodiments may be implemented.

Referring next to FIG. 8, an exemplary environment with which embodiments may be implemented is shown with a computer system 800 that can be used by a user 804 to program, design or otherwise interact with the computer system 800. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A user 804 can input commands into the computer 802 using various input devices, such as a mouse, keyboard 822, track ball, touch screen, etc. If the computer system 800 comprises a mainframe, a user 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
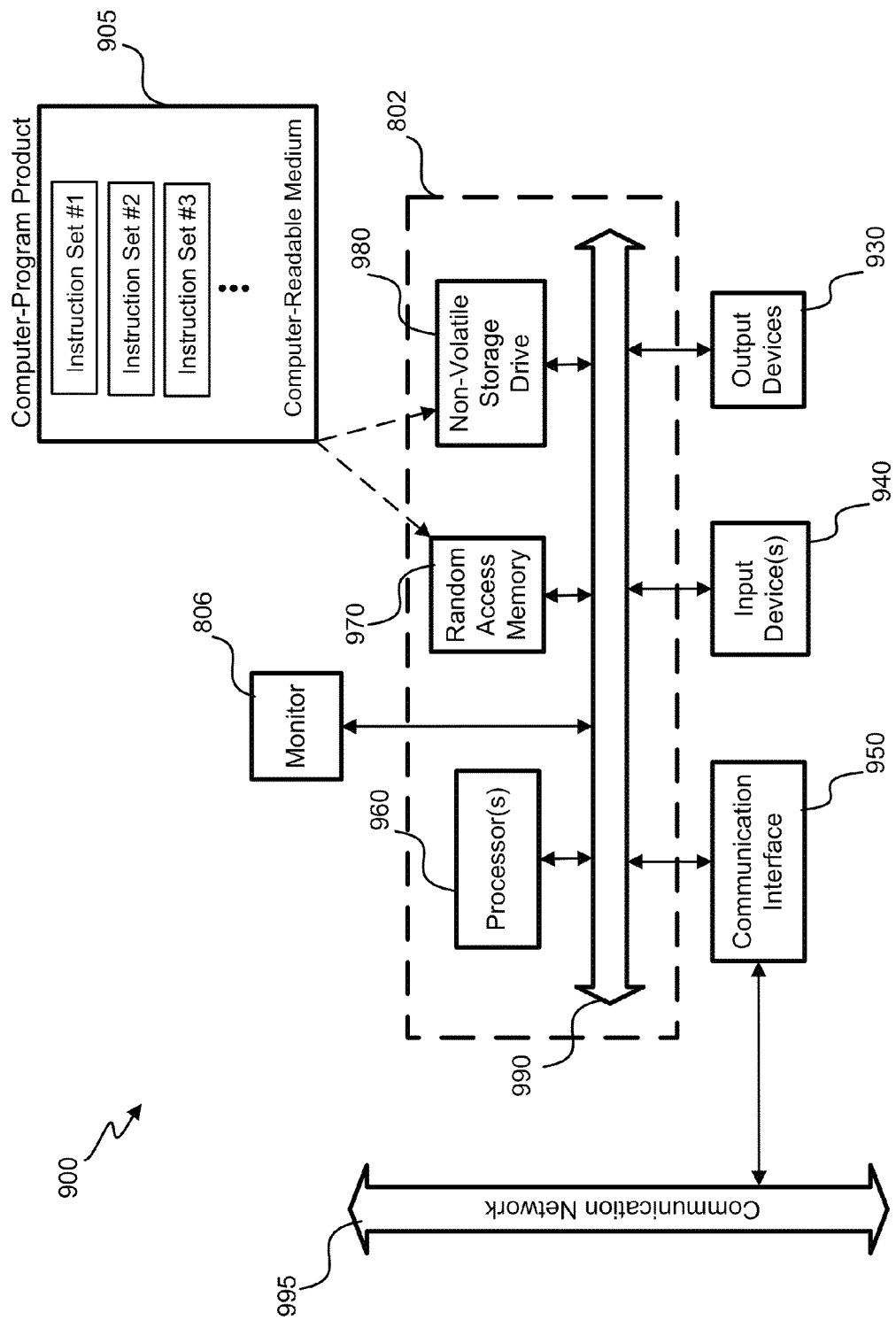
FIG. 9 illustrates one example of a special-purpose computer system, according to some embodiments.

With reference to FIG. 9, an embodiment of a special-purpose computer system 900 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 900.

Special-purpose computer system 900 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 900 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 906 via a command such as a click of a button or the like. User output devices 930 include all possible types of devices and mechanisms to output information from computer 802. These may include a display (e.g., monitor 906), printers, non-visual displays such as audio output devices, etc.

Communications interface 950 provides an interface to other communication networks and devices and may serve as an interface to receive data from and transmit data to other systems, WANs and/or the Internet 918. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

A number of variations and modifications of the disclosed embodiments can also be used. For example, embodiments show the DNS function being resident within a POP with edge servers, but other embodiments could place the DNS function geographically separate from any content serving functions. Other embodiments could place multiple DNS functions in a POP to divide the work load for those DNS requests received by the POP.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for dynamically selecting from among a plurality of acceleration techniques implemented in a Content Delivery Network (CDN) using attributes associated with content requests, comprising:
   a network interface that receives the content requests from a plurality of client systems for content stored in a plurality of edge servers distributed geographically throughout the CDN, wherein:
      the content requests comprise a first content request for first content;
      the first content request originates from a first client system in the plurality of client systems; and
      the first content request is associated with one or more attributes; and
   an intermediate server that accelerates access to the content stored in the plurality of edge servers, the intermediate server comprising:
      a first interface coupled to the network interface;
      a second interface configured to communicate with at least one of the plurality of edge servers of the CDN;
      one or more memory devices having stored thereon:
         instructions for executing each of the plurality of acceleration techniques; and
         a plurality of acceleration profiles, wherein each of the plurality of acceleration profiles specifies at least one of the plurality of acceleration techniques; and
      a processor configured to:
         access the one or more attributes associated with the first content request;
         select one or more acceleration techniques from the plurality of acceleration techniques, wherein:
            the one or more acceleration techniques are selected based on the one or more attributes; and
            the one or more acceleration techniques modify the content;
         use the one or more acceleration techniques to provide the content to the first client system;
         receive metrics from the first client system, wherein the metrics are associated with a performance in providing the first content to a user of the first client system;
         dynamically update a process by which the one or more acceleration techniques are selected based on the metrics; and
         use the updated process to select acceleration techniques for subsequent requests associated with similar attributes.

2. The system for dynamically selecting from among the plurality of acceleration techniques implemented in the CDN using the attributes associated with the content requests of claim 1, wherein the one or more attributes comprises a geographic location of the first client system.

3. The system for dynamically selecting from among the plurality of acceleration techniques implemented in the CDN using the attributes associated with the content requests of claim 1, wherein the intermediate server is physically combined with one of the plurality of edge servers of the CDN.

4. The system for dynamically selecting from among the plurality of acceleration techniques implemented in the CDN using the attributes associated with the content requests of claim 1, wherein the one or more acceleration techniques selected by the intermediate server are selected as one of the plurality of acceleration profiles.

5. The system for dynamically selecting from among the plurality of acceleration techniques implemented in the CDN using the attributes associated with the content requests of claim 1, wherein the first client system comprises a testbed simulator that is configured to simulate a plurality of client system configurations and network connections.

6. The system for dynamically selecting from among the plurality of acceleration techniques implemented in the CDN using the attributes associated with the content requests of claim 1, wherein the one or more attributes are received by the intermediate server separately from the first content request.

7. The system for dynamically selecting from among the plurality of acceleration techniques implemented in the CDN using the attributes associated with the content requests of claim 1, wherein the one or more attributes are received by the intermediate server together with the first content request.

8. The system for dynamically selecting from among the plurality of acceleration techniques implemented in the CDN using the attributes associated with the content requests of claim 1, wherein a first acceleration technique in the plurality of acceleration techniques is dependent on a second acceleration techniques in the plurality of acceleration techniques such that the first acceleration technique and the second acceleration technique are executed in a predetermined order.

9. The system for dynamically selecting from among the plurality of acceleration techniques implemented in the CDN using the attributes associated with the content requests of claim 1, wherein each of the plurality of acceleration profiles comprises a multidimensional data structure, wherein each dimension of the multidimensional data structure is associated with a corresponding one of the one or more attributes.

10. The system for dynamically selecting from among the plurality of acceleration techniques implemented in the CDN using the attributes associated with the content requests of claim 1, wherein the plurality of acceleration techniques comprises preemptively compressing media files to be transmitted to the client device.

11. The system for dynamically selecting from among the plurality of acceleration techniques implemented in the CDN using the attributes associated with the content requests of claim 1, wherein the plurality of acceleration techniques comprises optimizing code associated with the first content.

12. The system for dynamically selecting from among the plurality of acceleration techniques implemented in the CDN using the attributes associated with the content requests of claim 1, wherein the plurality of acceleration techniques comprises identifying portions of the content that are dynamic and caching portions of the content that are static.

13. The system for dynamically selecting from among the plurality of acceleration techniques implemented in the CDN using the attributes associated with the content requests of claim 1, wherein the processor is further configured to dynamically select one or more acceleration techniques from the plurality of acceleration techniques based attributes for each request received by the intermediate server.

14. A method of dynamically selecting from among a plurality of acceleration techniques implemented in a Content Delivery Network (CDN) using attributes associated with content requests, the method comprising:
   receiving a first content request for first content through a network interface, wherein:
      the network interface is configured to receive the content requests from a plurality of client systems for content stored in a plurality of edge servers distributed geographically throughout the CDN;
      the first content request originates from a first client system in the plurality of client systems;
      the first content request is associated with one or more attributes;
   accessing, by an intermediate server, the one or more attributes associated with the first content request, wherein:
      the intermediate server is configured to accelerate access to the content stored in the plurality of edge servers;
   selecting, by the intermediate server, one or more acceleration techniques from the plurality of acceleration techniques, wherein:
      the one or more acceleration techniques are selected based on the one or more attributes;
      the one or more acceleration techniques modify the content; and
      the one or more acceleration techniques form a first acceleration profile in a plurality of acceleration profiles;
   using, by the intermediate server, the one or more acceleration techniques to provide the content to the first client system
   receiving, by the intermediate server, metrics from the first client system, wherein the metrics are associated with a performance in providing the first content to a user of the first client system;
   dynamically updating, by the intermediate server, a process by which the one or more acceleration techniques are selected based on the metrics; and
   using, by the intermediate server, the updated process to select acceleration techniques for subsequent requests associated with similar attributes.

15. The method of dynamically selecting from among the plurality of acceleration techniques implemented in the CDN using the attributes associated with the content requests of claim 14, wherein the one or more attributes affect a performance of the one or more acceleration techniques in providing the first content to a user of the first client system.

16. The method of dynamically selecting from among the plurality of acceleration techniques implemented in the CDN using the attributes associated with the content requests of claim 14, wherein the one or more attributes are descriptive of the first client system or a network through which the first content request is received.

17. The method of dynamically selecting from among the plurality of acceleration techniques implemented in the CDN using the attributes associated with the content requests of claim 14, wherein the one or more attributes comprises a measurement of latency associated with transmitting content from the CDN to the first client system.

18. The method of dynamically selecting from among the plurality of acceleration techniques implemented in the CDN using the attributes associated with the content requests of claim 14, wherein the one or more attributes comprises a device type of the first client system.

19. The method of dynamically selecting from among the plurality of acceleration techniques implemented in the CDN using the attributes associated with the content requests of claim 14, wherein the first client system comprises a testbed simulator that is configured to simulate a plurality of client system configurations and network connections.

* * * * *